US011152006B2

(12) United States Patent
Krupka et al.

(10) Patent No.: US 11,152,006 B2
(45) Date of Patent: Oct. 19, 2021

(54) VOICE IDENTIFICATION ENROLLMENT

(71) Applicant: Microsoft Technology Licensing, LLC, Redmond, WA (US)

(72) Inventors: Eyal Krupka, Redmond, WA (US); Shixiong Zhang, Redmond, WA (US); Xiong Xiao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 16/020,911

(22) Filed: Jun. 27, 2018

(65) Prior Publication Data

US 2019/0341055 A1 Nov. 7, 2019

Related U.S. Application Data

(60) Provisional application No. 62/668,147, filed on May 7, 2018.

(51) Int. Cl.
*G10L 17/04* (2013.01)
*G10L 17/22* (2013.01)
*G10L 17/02* (2013.01)
*G10L 25/84* (2013.01)

(52) U.S. Cl.
CPC .............. *G10L 17/04* (2013.01); *G10L 17/02* (2013.01); *G10L 17/22* (2013.01); *G10L 25/84* (2013.01)

(58) Field of Classification Search
None
See application file for complete search history.

(56) References Cited

U.S. PATENT DOCUMENTS

| | | | | |
|---|---|---|---|---|
| 6,369,846 B1* | 4/2002 | Katsumi | ................ | H04N 7/152 348/14.01 |
| 7,386,448 B1* | 6/2008 | Poss | ........................ | G10L 17/24 379/188 |
| 2003/0144837 A1* | 7/2003 | Basson | ................... | G10L 15/32 704/231 |

(Continued)

FOREIGN PATENT DOCUMENTS

EP 1395803 A1 3/2004

OTHER PUBLICATIONS

T. Hori et al., "Low-Latency Real-Time Meeting Recognition and Understanding Using Distant Microphones and Omni-Directional Camera," in IEEE Transactions on Audio, Speech, and Language Processing, vol. 20, No. 2, pp. 499-513, Feb. 2012.*

(Continued)

*Primary Examiner* — Thuykhanh Le
(74) *Attorney, Agent, or Firm* — Alleman Hall Creasman & Tuttle LLP

(57) ABSTRACT

Examples are disclosed that relate to voice identification enrollment. One example provides a method of voice identification enrollment comprising, during a meeting in which two or more human speakers speak at different times, determining whether one or more conditions of a protocol for sampling meeting audio used to establish human speaker voiceprints are satisfied, and in response to determining that the one or more conditions are satisfied, selecting a sample of meeting audio according to the protocol, the sample representing an utterance made by one of the human speakers. The method further comprises establishing, based at least on the sample, a voiceprint of the human speaker.

18 Claims, 13 Drawing Sheets

(56) References Cited

U.S. PATENT DOCUMENTS

| | | | | |
|---|---|---|---|---|
| 2003/0223562 | A1* | 12/2003 | Cui | H04L 12/1813 379/202.01 |
| 2004/0249634 | A1* | 12/2004 | Degani | G10L 17/26 704/207 |
| 2008/0079693 | A1* | 4/2008 | Okamoto | H04N 7/142 345/157 |
| 2009/0043573 | A1* | 2/2009 | Weinberg | G10L 17/06 704/223 |
| 2009/0248414 | A1* | 10/2009 | Shimomori | G10L 17/00 704/246 |
| 2010/0100376 | A1* | 4/2010 | Harrington | G06K 9/6247 704/235 |
| 2010/0216429 | A1* | 8/2010 | Mahajan | G06F 21/6245 455/411 |
| 2011/0267499 | A1* | 11/2011 | Wan | H04N 5/23296 348/231.99 |
| 2013/0021459 | A1* | 1/2013 | Vasilieff | H04N 7/183 348/77 |
| 2013/0225128 | A1* | 8/2013 | Gomar | H04W 12/06 455/411 |
| 2013/0332165 | A1* | 12/2013 | Beckley | G10L 15/20 704/246 |
| 2014/0214417 | A1* | 7/2014 | Wang | G10L 17/04 704/232 |
| 2014/0257799 | A1* | 9/2014 | Shepard | H03G 3/3005 704/206 |
| 2014/0343935 | A1* | 11/2014 | Jung | G10L 15/08 704/233 |
| 2014/0372126 | A1* | 12/2014 | Ady | G06F 3/167 704/270.1 |
| 2014/0379340 | A1* | 12/2014 | Timem | H04L 63/102 704/246 |
| 2015/0025887 | A1* | 1/2015 | Sidi | G10L 17/04 704/245 |
| 2015/0088496 | A1* | 3/2015 | Harada | H04M 11/10 704/210 |
| 2015/0206534 | A1* | 7/2015 | Shinkai | G10L 15/22 704/270.1 |
| 2015/0296289 | A1* | 10/2015 | Lakkundi | H04R 3/005 381/92 |
| 2016/0217792 | A1* | 7/2016 | Gorodetski | G10L 17/04 |
| 2016/0231830 | A1* | 8/2016 | Nemala | G06F 3/04842 |
| 2016/0234616 | A1* | 8/2016 | Gateau | G10L 17/00 |
| 2016/0284354 | A1* | 9/2016 | Chen | H04N 7/147 |
| 2016/0337507 | A1* | 11/2016 | Jang | H04M 1/72454 |
| 2016/0365095 | A1* | 12/2016 | Lousky | G10L 17/04 |
| 2017/0140760 | A1* | 5/2017 | Sachdev | G10L 17/06 |
| 2017/0309296 | A1* | 10/2017 | Sun | H04N 21/440281 |
| 2017/0323643 | A1* | 11/2017 | Arslan | G10L 17/00 |
| 2017/0337933 | A1* | 11/2017 | Forte | G10L 21/0208 |
| 2018/0018973 | A1* | 1/2018 | Moreno | G10L 17/14 |
| 2018/0048767 | A1* | 2/2018 | Tinsman | H04M 1/6008 |
| 2018/0350372 | A1* | 12/2018 | Liu | G10L 17/24 |
| 2019/0214023 | A1* | 7/2019 | Ihara | G06Q 30/06 |
| 2020/0072937 | A1* | 3/2020 | Baek | G10L 15/22 |
| 2020/0133594 | A1* | 4/2020 | Parthasarathy | B41J 29/38 |

OTHER PUBLICATIONS

"International Search Report and Written Opinion Issued in PCT Patent Application No. PCT/US2019/029767", dated Jul. 5, 2019, 11 Pages.

* cited by examiner

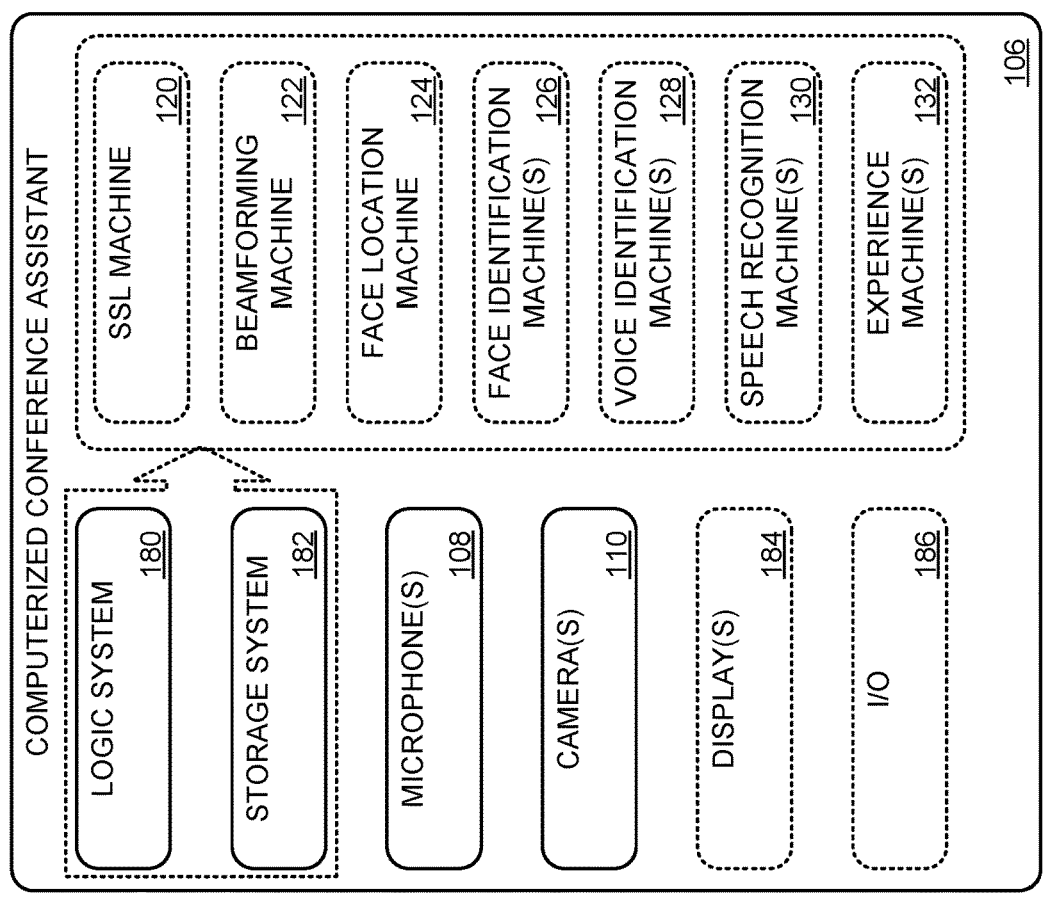
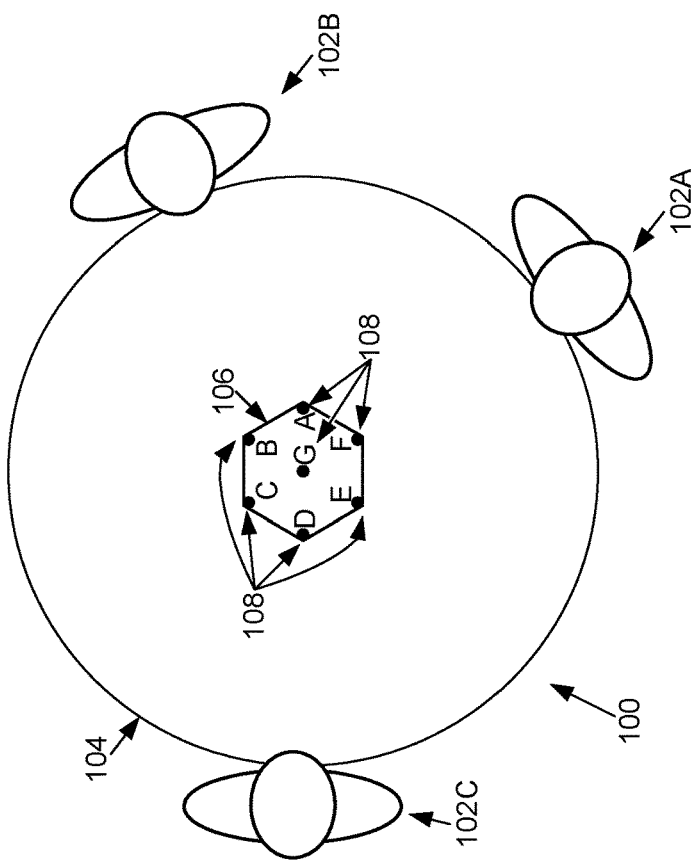

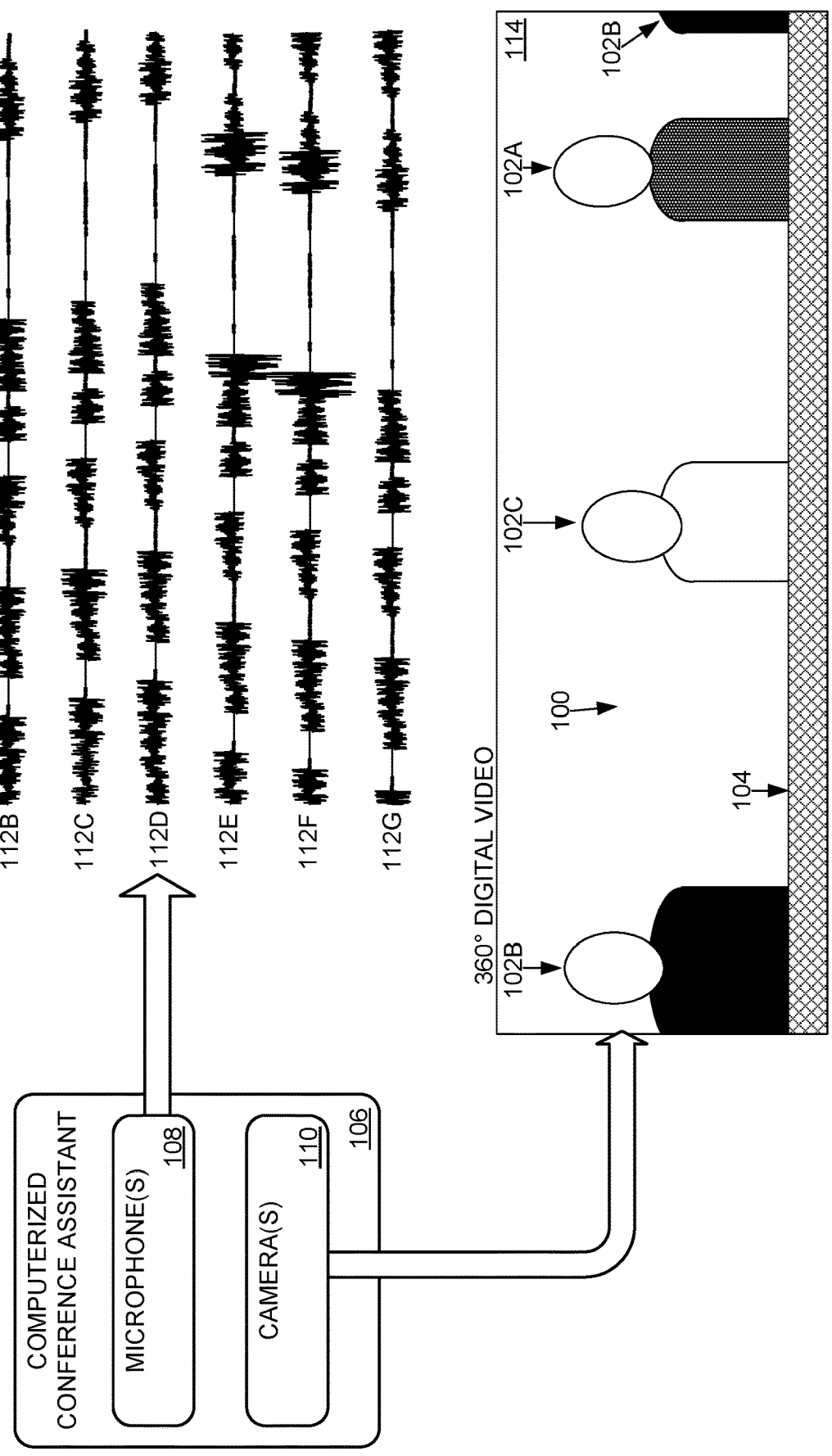

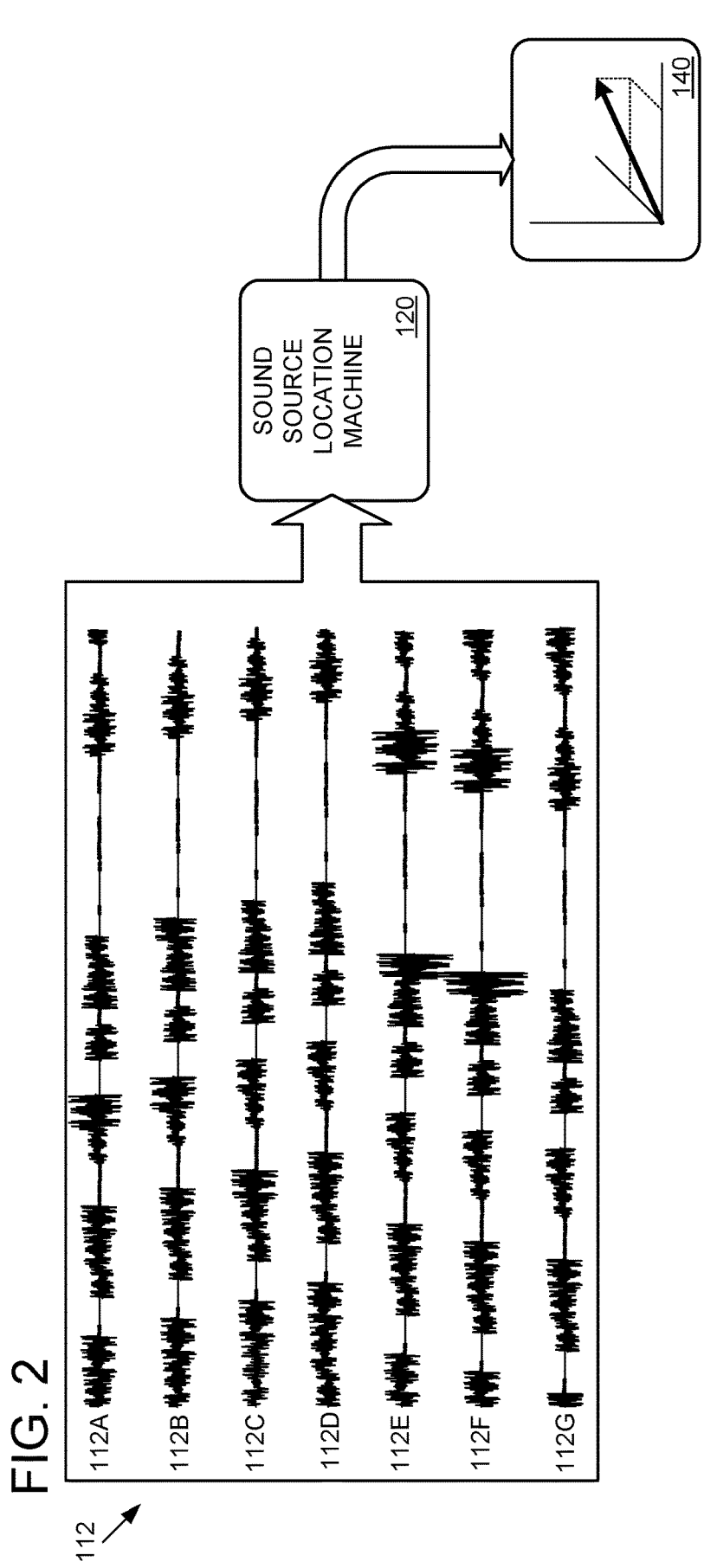

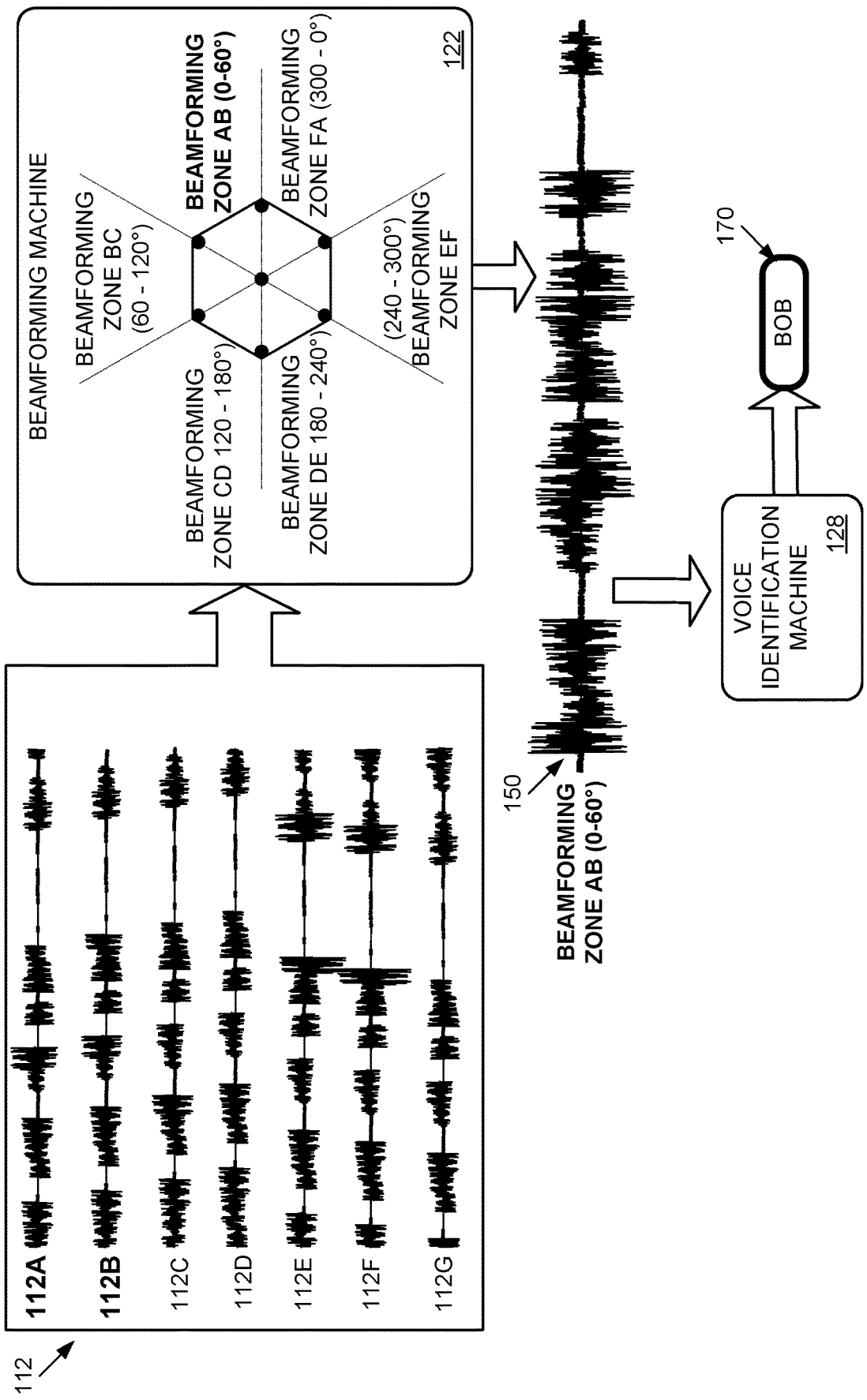

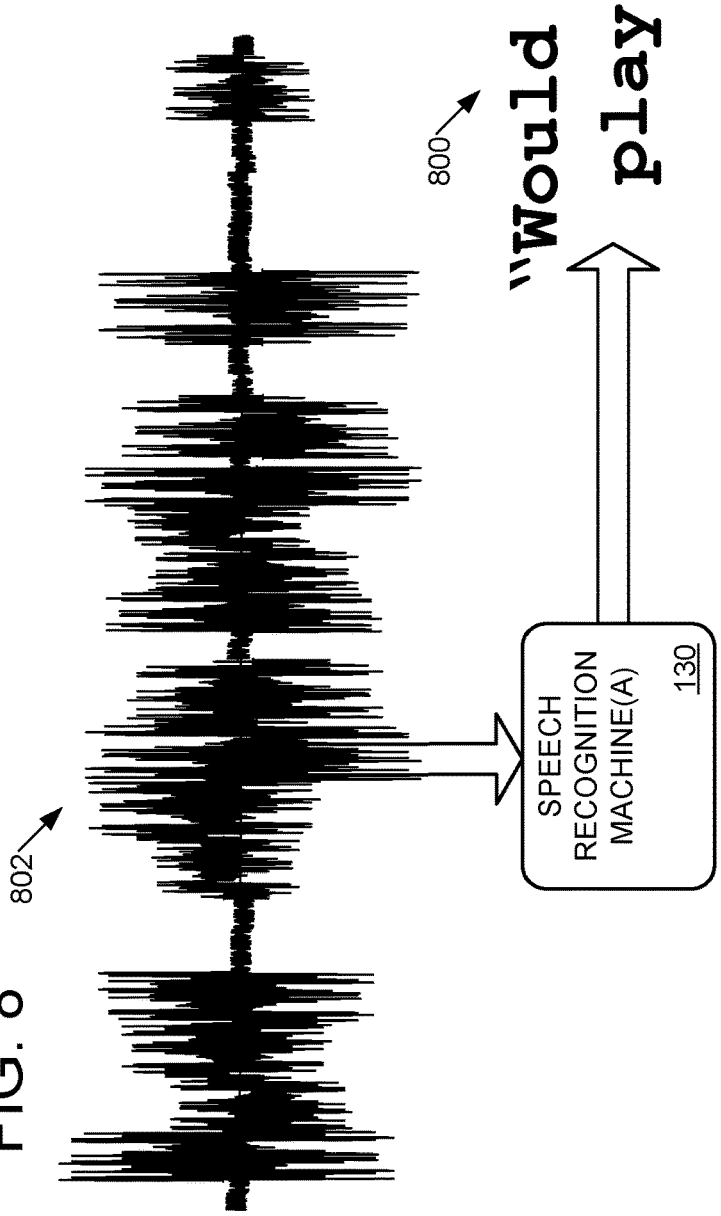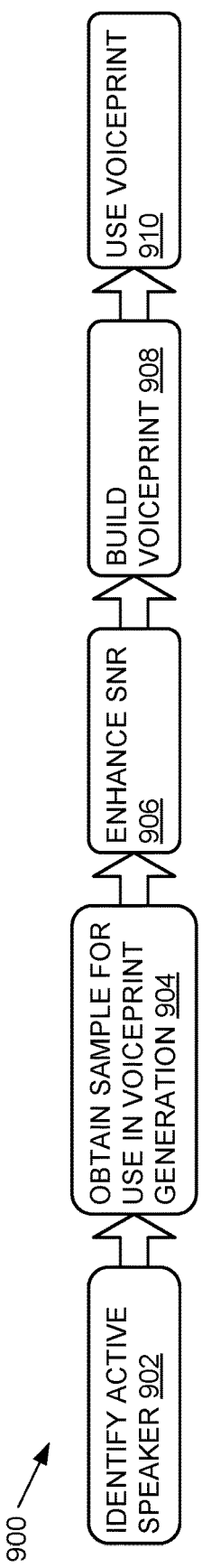

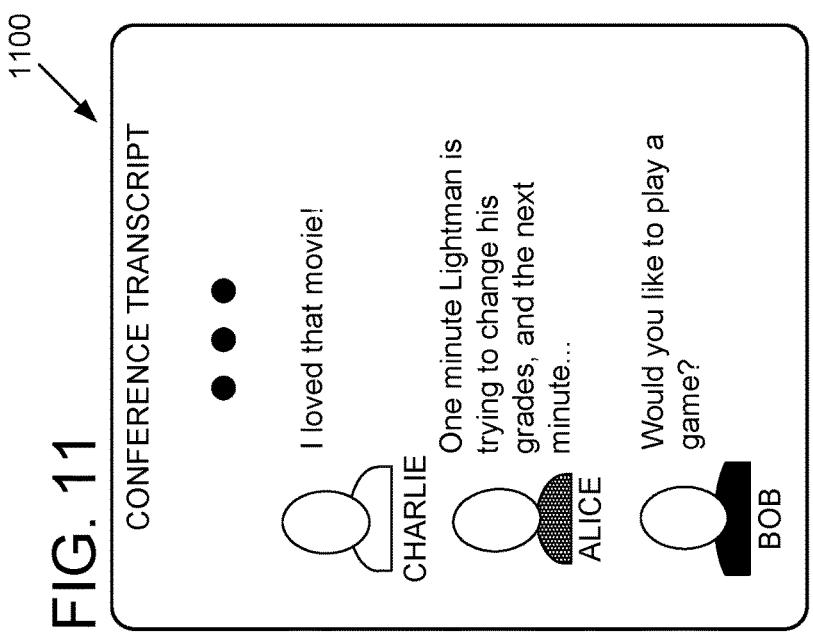
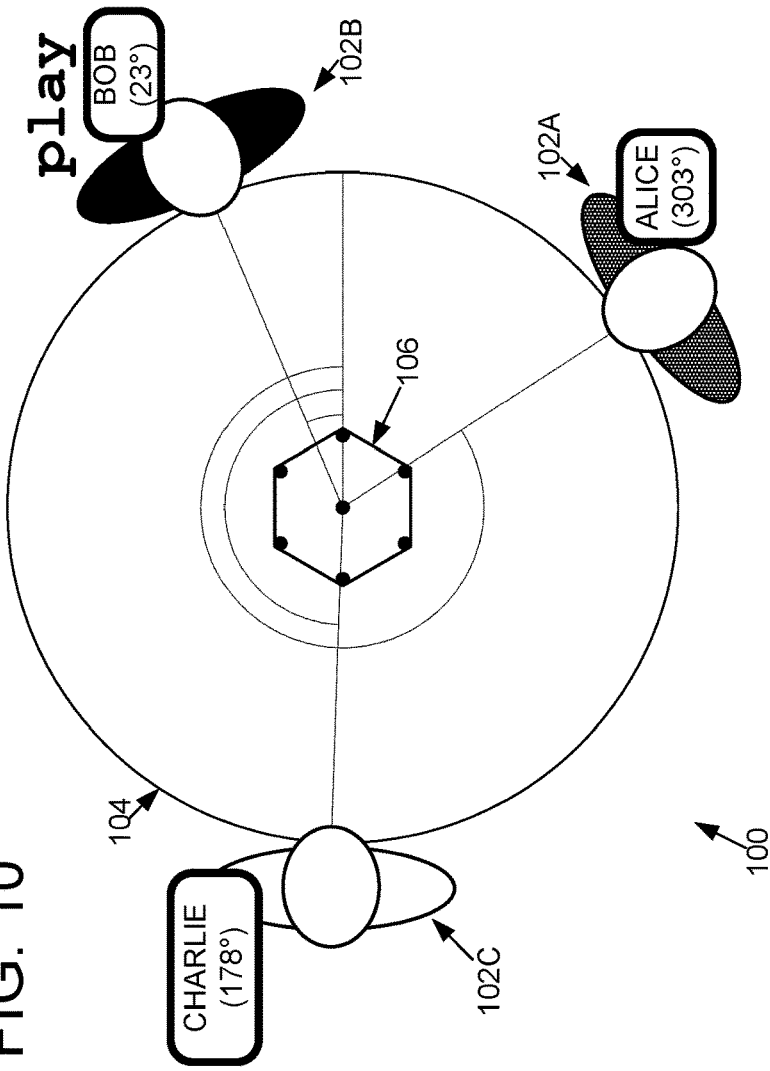

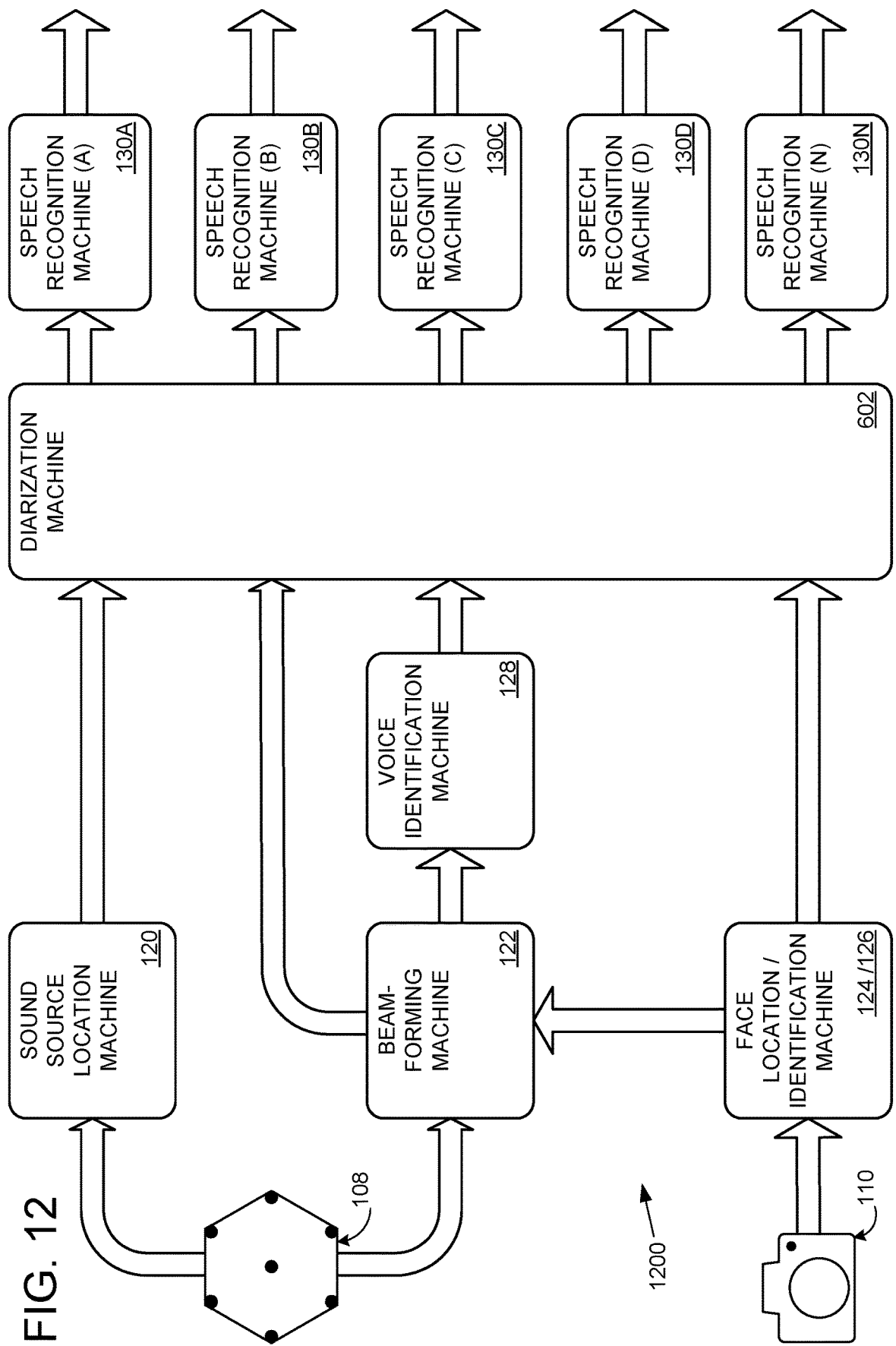

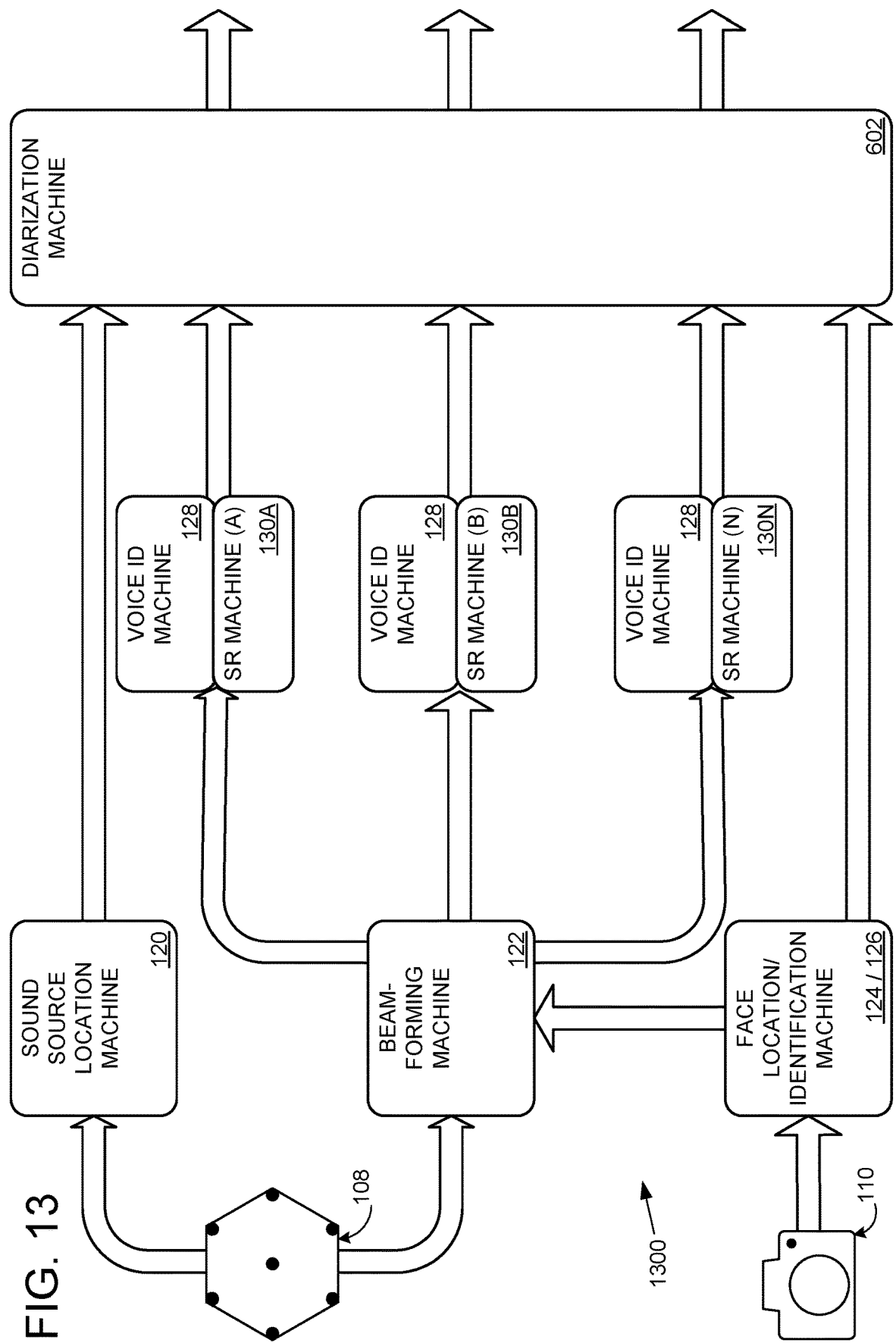

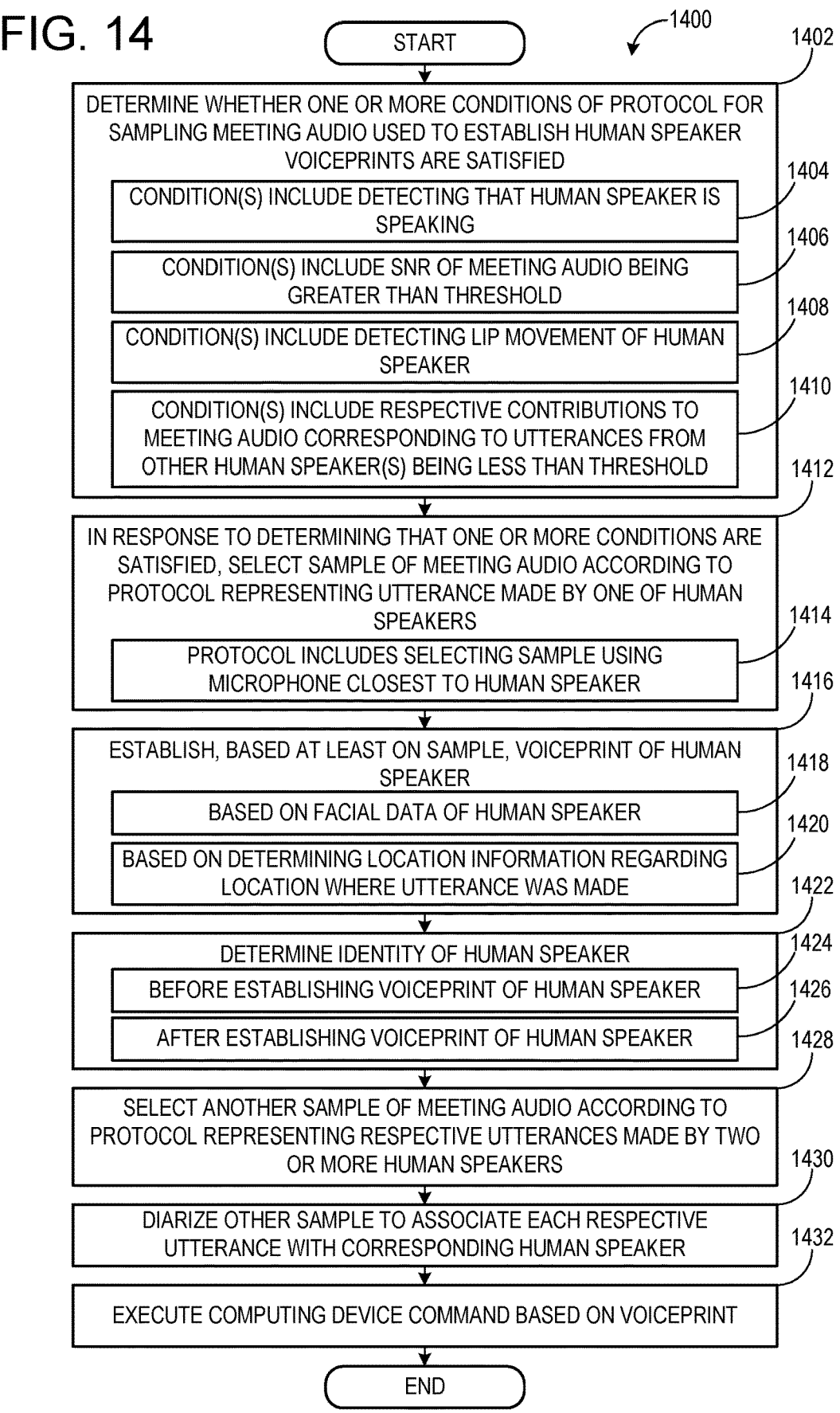

VOICE IDENTIFICATION ENROLLMENT

CROSS REFERENCE TO RELATED APPLICATIONS

This application claims priority to U.S. Provisional Patent Application Ser. No. 62/668,147, filed May 7, 2018, the entirety of which is hereby incorporated herein by reference for all purposes.

BACKGROUND

Human speech may be converted to text using machine learning and various other technologies. Distinguishing among different speakers and recognizing speech components typically involves an enrollment procedure in which audio from a targeted speaker is sampled and processed to generate a voice signature.

BRIEF DESCRIPTION OF THE DRAWINGS

FIG. 1A shows an example computerized conference assistant configured to select audio samples of a meeting in which multiple human speakers speak at different times.

FIG. 1B shows aspects of the computerized conference assistant of FIG. 1A.

FIG. 1C illustrates an example of directional sound recording carried out by the computerized conference assistant of FIG. 1A.

FIG. 2 shows aspects of an example sound source localization machine of the computerized conference assistant of FIG. 1A.

FIG. 3 shows aspects of an example beamforming machine of the computerized conference assistant of FIG. 1A.

FIG. 8 shows aspects of an example speech recognition machine of the computerized conference assistant of FIG. 1A.

FIG. 9 shows a flowchart illustrating an example method of conducting voice enrollment.

FIG. 10 illustrates an example of voice transcription.

FIG. 11 shows an example conference transcript.

FIG. 12 shows an example framework in which speech recognition machines are downstream from the diarization machine of the computerized conference assistant of FIG. 1A.

FIG. 13 shows an example framework in which speech recognition machines are upstream from a diarization machine of the computerized conference assistant of FIG. 1A.

FIG. 14 shows a flowchart illustrating an example method of voice identification enrollment.

DETAILED DESCRIPTION

Figure 4:
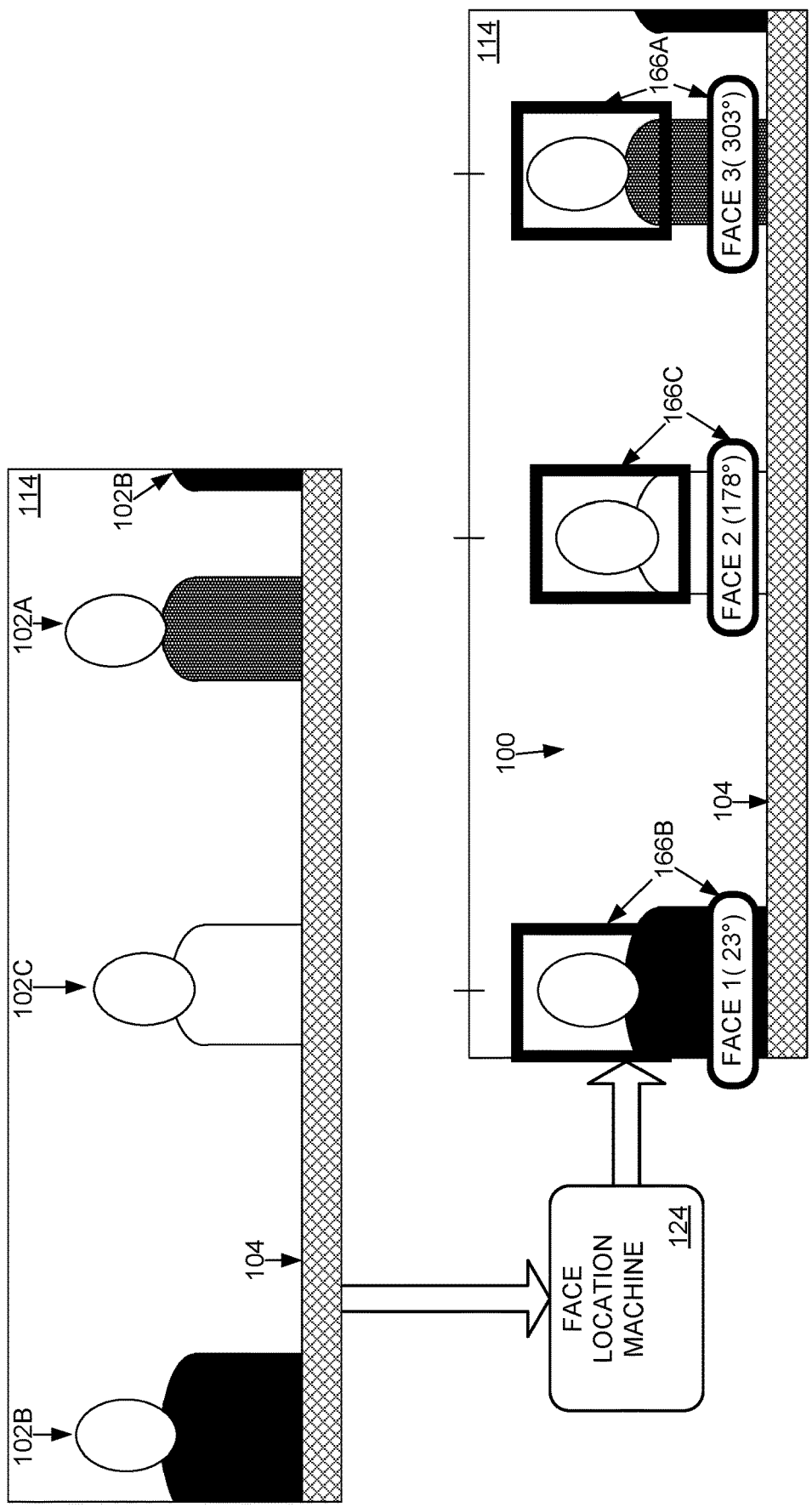
FIG. 4 shows aspects of an example face location machine of the computerized conference assistant of FIG. 1A.

As described above, distinguishing among different speakers and accurately recognizing speech components typically involves an enrollment procedure in which audio from a targeted speaker is sampled and processed to generate a voice signature. In such enrollment procedures, audio samples including human speech of longer duration generally may be preferred over those of relatively shorter duration, as longer speech portions can produce more accurate identification of human speakers and generation of voice signatures. However, in typical settings, vocalizations from a given speaker may come in short bursts and be frequently interrupted by other sounds. Vocalizations from other speakers or other sounds may occur at the same time as the target speech. These are but a few examples—a variety of factors and circumstances can make it difficult to obtain high quality speech samples of sufficient duration for enrollment.

In some approaches, enrollment is performed via dedicated sessions. For example, speakers may be prompted to speak predefined passages clearly in a controlled environment (e.g., at a prescribed distance from a microphone). This separate, dedicated step can be a barrier to enrollment—it is time-consuming to a degree, and potential enrollees may find it bothersome to a point where they put off or avoid enrollment altogether. At a minimum, some amount of inconvenience is inherent in this approach.

As such, examples are disclosed herein that relate to an improved approach for voice identification enrollment. In some examples, samples of meeting audio, in which two or more human speakers speak at different times, are selected according to a protocol for establishing human speaker voiceprints. One or more conditions are defined for the protocol, and determining that the conditions are satisfied may lead to the selection of a sample of meeting audio. The conditions may be defined such that desirable opportunities for collecting audio samples are identified and leveraged to establish voiceprints. As described below, opportunities may be considered desirable when the signal-to-noise ratio of meeting audio is above a threshold, when respective contributions to meeting audio from speakers other than one for which voiceprint establishment is desired are less than a threshold, and/or when lip movement of a human speaker is detected, among other possible scenarios. Examples are also disclosed herein for optimizing the configuration of an audio recording system used to collect audio samples. The approaches disclosed herein may facilitate a voice identification enrollment process that is unobtrusive, non-disruptive to the user experience, and does not explicitly prompt human speakers to speak predetermined phrases or perform other predetermined actions. As described below, voiceprints may be generated—and/or subsequently used—to identify human speakers, recognize speech components, and transcribe speech, among other potential purposes. FIG. 1A shows an example conference environment 100 including three conference participants 102A, 102B, and 102C meeting around a table 104. A computerized conference assistant 106 is on table 104 ready to facilitate a meeting between the conference participants. Computerized conference assistants consistent with this disclosure may be configured with a myriad of features designed to facilitate productive meetings. However, the following description primarily focuses on features pertaining to using recorded speech to identify/authenticate speakers, and convert vocalizations into recognized speech components (e.g., for voice commands, transcriptions, etc.). Since computerized conference assistant 106 may be employed in meetings attended by multiple human speakers that may speak at different and sometimes overlapping times, the assistant may attempt to differentiate among different speakers. This may include attributing utterances in meeting audio to individual, different speakers, as well as identifying opportunities to select meeting audio that enable differentiation among speakers and the collection of audio samples of desirable signal quality. While the following description uses computerized conference assistant 106 as an example computer configured to perform such identification/recognition, other computers or combinations of computers having any number of different microphone and/or camera configurations may be configured to implement the techniques described below. As such, the present disclosure is in no way limited to computerized conference assistant 106.

FIG. 1B schematically shows relevant aspects of computerized conference assistant 106, each of which is discussed below. Of particular relevance, computerized conference assistant 106 includes microphone(s) 108—also referred to herein as a "recording system"—and camera(s) 110.

As shown in FIG. 1A, the computerized conference assistant 106 includes an array of seven microphones 108A, 108B, 108C, 108D, 108E, 108F, and 108G. As shown in FIG. 1C, these microphones 108 are configured to directionally record sound and convert the audible sound into a computer-readable signal 112 (i.e., signals 112a, 112b, 112c, 112d, 112e, 112f, and 112g respectively). Microphones 108A-F are equally spaced around the computerized conference assistant 106 and aimed to directionally record sound originating in front of the microphone. Microphone 108g is positioned between the other microphones and aimed upward.

In some implementations, computerized conference assistant 106 includes a 360° camera configured to convert light of one or more spectral bands (e.g., visible, infrared, and/or near infrared) into a 360° digital video 114 or other suitable visible, infrared, near infrared, spectral, and/or depth digital video. In some implementations, the 360° camera may include fisheye optics that redirect light from all azimuthal angles around the computerized conference assistant 106 to a single matrix of light sensors, and logic for mapping the independent measurements from the sensors to a corresponding matrix of pixels in the 360° digital video 114. In some implementations, two or more cooperating cameras may take overlapping sub-images that are stitched together into digital video 114. In some implementations, camera(s) 110 have a collective field of view of less than 360° and/or two or more originating perspectives (e.g., cameras pointing toward a center of the room from the four corners of the room). 360° digital video 114 is shown as being substantially rectangular without appreciable geometric distortion, although this is in no way required.

Returning briefly to FIG. 1B, computerized conference assistant 106 includes a sound source localization (SSL) machine 120 that is configured to estimate the location(s) of sound(s) based on signals 112. FIG. 2 schematically shows SSL machine 120 analyzing signals 112a-g to output an estimated origination 140 of the sound modeled by signals 112a-g. As introduced above, signals 112a-g are respectively generated by microphones 108a-g. Each microphone has a different physical position and/or is aimed in a different direction. Microphones that are farther from a sound source and/or aimed away from a sound source will generate a relatively lower amplitude and/or slightly phase delayed signal 112 relative to microphones that are closer to and/or aimed toward the sound source. As an example, while microphones 108a and 108d may respectively produce signals 112a and 112d in response to the same sound, signal 112a may have a measurably greater amplitude if the recorded sound originated in front of microphone 108a. Similarly, signal 112d may be phase shifted behind signal 112a due to the longer time of flight (ToF) of the sound to microphone 108d. SSL machine 120 may use the amplitude, phase difference, and/or other parameters of the signals 112a-g to estimate the origination 140 of a sound. SSL machine 120 may be configured to implement any suitable two- or three-dimensional location algorithms, including but not limited to previously-trained artificial neural networks, maximum likelihood algorithms, multiple signal classification algorithms, and cross-power spectrum phase analysis algorithms. Depending on the algorithm(s) used in a particular application, the SSL machine 120 may output an angle, vector, coordinate, and/or other parameter estimating the origination 140 of a sound. Such output—an angle, vector, coordinate, etc.—and/or one or more parameters of signals 112a-g described above—amplitude, phase difference, etc.—may be referred to as "location information," and may be used to establish a voiceprint of a human speaker—e.g., by helping localize where utterances are made and thus the speaker from which they originate.

As shown in FIG. 1B, computerized conference assistant 106 also includes a beamforming machine 122. The beamforming machine 122 may be configured to isolate sounds originating in a particular zone (e.g., a 0-60° arc) from sounds originating in other zones. In the embodiment depicted in FIG. 3, beamforming machine 122 is configured to isolate sounds in any of six equally-sized static zones. In other implementations, there may be more or fewer static zones, dynamically sized zones (e.g., a focused 15° arc), and/or dynamically aimed zones (e.g., a 60° zone centered at 9°). Any suitable beamforming signal processing may be utilized to subtract sounds originating outside of a selected zone from a resulting beamformed signal 150. In implementations that utilize dynamic beamforming, the location of the various speakers may be used as criteria for selecting the number, size, and centering of the various beamforming zones. As one example, the number of zones may be selected to equal the number of speakers, and each zone may be centered on the location of the speaker (e.g., as determined via face identification and/or sound source localization). In some implementations a beamforming machine may be configured to independently and simultaneously listen to two or more different zones, and output two or more different beamformed signals in parallel. As such, two or more overlapping/interrupting speakers may be independently processed. The operation of beamforming machine 122—and the zone-based audio processing described above—is one example of how one or more operating parameters of a recording system, of which the beamforming machine may form part, may be adjusted (e.g., to increase a signal-to-noise ratio of audio samples).

As shown in FIG. 1B, computerized conference assistant 106 includes a face location machine 124 and a face identification machine 126. As shown in FIG. 4, face location machine 124 is configured to find candidate faces 166 in digital video 114. As an example, FIG. 4 shows face location machine 124 finding candidate FACE(1) at 23°, candidate FACE(2) at 178°, and candidate FACE(3) at 303°. The candidate faces 166 output by the face location machine 124 may include coordinates of a bounding box around a located face image, a portion of the digital image where the face was located, other location information (e.g., an angle such as 23°), and/or labels (e.g., "FACE(1)"). Facial image data utilized by face location machine 124 and face identification machine 126, and/or output from the face location machine and face identification machine, may be referred to as "facial data," and may be used to establish a voiceprint of a human speaker.

Figure 5:
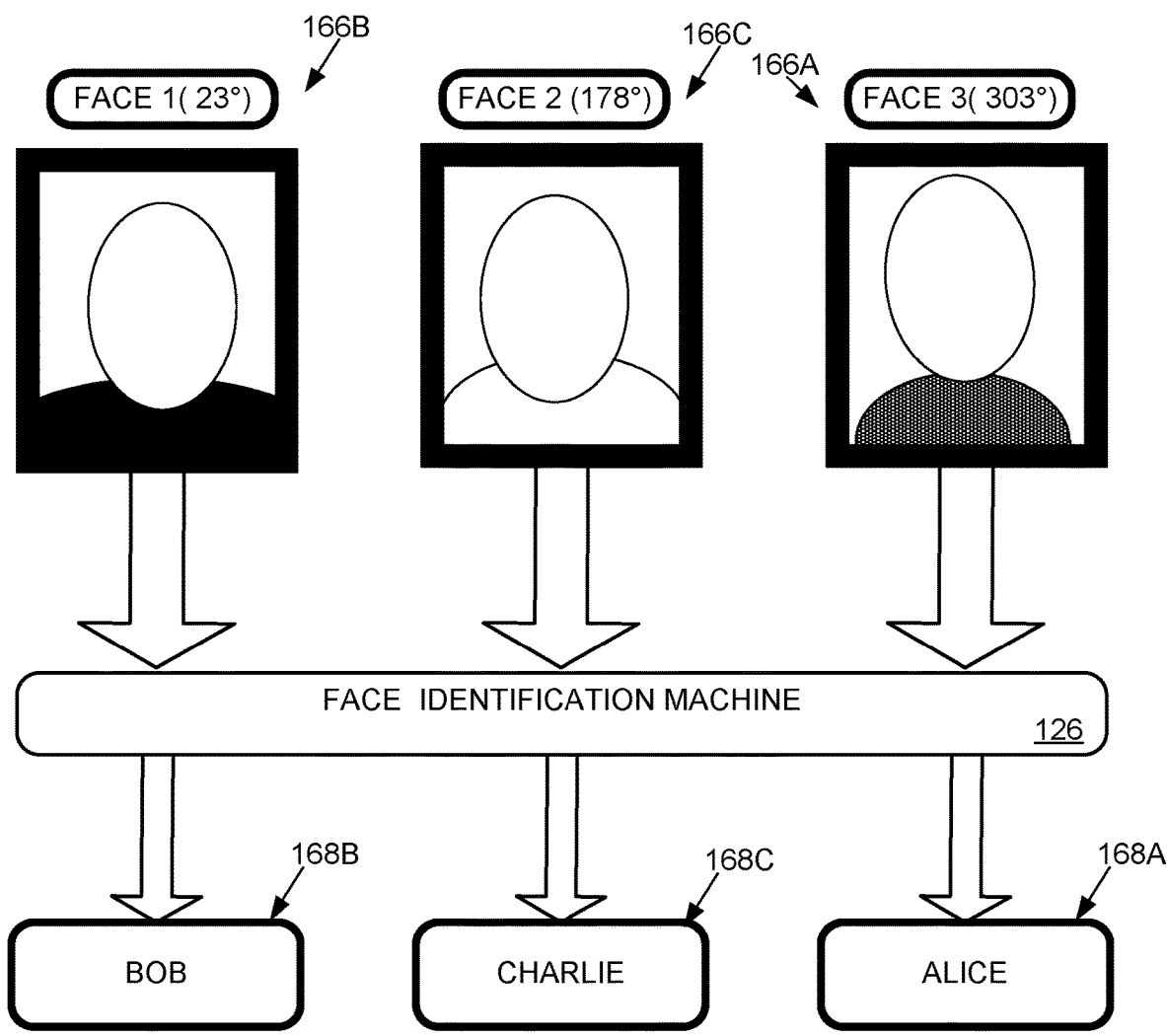
FIG. 5 shows aspects of an example face identification machine of the computerized conference assistant of FIG. 1A.

Face identification machine 164 optionally may be configured to determine an identity 168 of each candidate face 166 by analyzing just the portions of the digital video 114 where candidate faces 166 have been found. In other implementations, the face location step may be omitted, and the face identification machine may analyze a larger portion of the digital video 114 to identify faces. FIG. 5 shows an example in which face identification machine 126 identifies candidate FACE(1) as "Bob," candidate FACE(2) as "Charlie," and candidate FACE(3) as "Alice." While not shown, each identity 168 may have an associated confidence value, and two or more different identities 168 having different confidence values may be found for the same face (e.g., Bob (88%), Bert (33%)). If an identity with at least a threshold confidence cannot be found, the face may remain unidentified and/or may be given a generic unique identity 168 (e.g., "Guest(42)"). Speech may be attributed to such generic unique identities.

When used, face location machine 124 may employ any suitable combination of state-of-the-art and/or future machine learning (ML) and/or artificial intelligence (AI) techniques. Non-limiting examples of techniques that may be incorporated in an implementation of face location machine 124 include support vector machines, multi-layer neural networks, convolutional neural networks (e.g., including spatial convolutional networks for processing images and/or videos), recurrent neural networks (e.g., long short-term memory networks (LSTM)), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by face location machine 124 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the face location machine 124.

Non-limiting examples of training procedures for face location machine 124 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of face location machine 124 may be trained simultaneously with regard to an objective function measuring performance of collective functioning of the plurality of components (e.g., with regard to reinforcement feedback and/or with regard to labelled training data), in order to improve such collective functioning. In some examples, one or more components of face location machine 124 may be trained independently of other components (e.g., offline training on historical data). For example, face location machine 124 may be trained via supervised training on labelled training data comprising images with labels indicating any face(s) present within such images, and with regard to an objective function measuring an accuracy, precision, and/or recall of locating faces by face location machine 124 as compared to actual locations of faces indicated in the labelled training data.

In some examples, face location machine 124 may employ a convolutional neural network configured to convolve inputs with one or more predefined, randomized and/or learned convolutional kernels. By convolving the convolutional kernels with an input vector (e.g., representing digital video 114), the convolutional neural network may detect a feature associated with the convolutional kernel. For example, a convolutional kernel may be convolved with an input image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers. Convolutional kernels of further convolutional layers may recognize higher-level visual features, e.g., shapes and patterns, and more generally spatial arrangements of lower-level visual features. Some layers of the convolutional neural network may accordingly recognize and/or locate visual features of faces (e.g., noses, eyes, lips). Accordingly, the convolutional neural network may recognize and locate faces in the input image. Although the foregoing example is described with regard to a convolutional neural network, other neural network techniques may be able to detect and/or locate faces and other salient features based on detecting low-level visual features, higher-level visual features, and spatial arrangements of visual features.

Face identification machine 126 may employ any suitable combination of state-of-the-art and/or future ML and/or AI techniques. Non-limiting examples of techniques that may be incorporated in an implementation of face identification machine 126 include support vector machines, multi-layer neural networks, convolutional neural networks, recurrent neural networks, associative memories, unsupervised spatial and/or clustering methods, and/or graphical models.

In some examples, face identification machine 126 may be implemented using one or more differentiable functions and at least partially determined by a set of trainable parameters. Accordingly, the trainable parameters may be adjusted through any suitable training procedure, in order to continually improve functioning of the face identification machine 126.

Non-limiting examples of training procedures for face identification machine 126 include supervised training, zero-shot, few-shot, unsupervised learning methods, reinforcement learning and/or generative adversarial neural network training methods. In some examples, a plurality of components of face identification machine 126 may be trained simultaneously with regard to an objective function measuring performance of collective functioning of the plurality of components in order to improve such collective functioning. In some examples, one or more components of face identification machine 126 may be trained independently of other components.

In some examples, face identification machine 126 may employ a convolutional neural network configured to detect and/or locate salient features of input images. In some examples, face identification machine 126 may be trained via supervised training on labelled training data comprising images with labels indicating a specific identity of any face(s) present within such images, and with regard to an objective function measuring an accuracy, precision, and/or recall of identifying faces by face identification machine 126 as compared to actual identities of faces indicated in the labelled training data. In some examples, face identification machine 126 may be trained via supervised training on labelled training data comprising pairs of face images with labels indicating whether the two face images in a pair are images of a single individual or images of two different individuals, and with regard to an objective function measuring an accuracy, precision, and/or recall of distinguishing single-individual pairs from two-different-individual pairs.

In some examples, face identification machine 126 may be configured to classify faces by selecting and/or outputting a confidence value for an identity from a predefined selection of identities, e.g., a predefined selection of identities for whom face images were available in training data used to train face identification machine 126. In some examples, face identification machine 126 may be configured to assess a feature vector representing a face, e.g., based on an output of a hidden layer of a neural network employed in face identification machine 126. Feature vectors assessed by face identification machine 126 for a face image may represent an embedding of the face image in a representation space learned by face identification machine 126. Accordingly, feature vectors may represent salient features of faces based on such embedding in the representation space.

In some examples, face identification machine 126 may be configured to enroll one or more individuals for later identification. Enrollment by face identification machine 126 may include assessing a feature vector representing the individual's face, e.g., based on an image and/or video of the individual's face. In some examples, identification of an individual based on a test image may be based on a comparison of a test feature vector assessed by face identification machine 126 for the test image, to a previously-assessed feature vector from when the individual was enrolled for later identification. Comparing a test feature vector to a feature vector from enrollment may be performed in any suitable fashion, e.g., using a measure of similarity such as cosine or inner product similarity, and/or by unsupervised spatial and/or clustering methods (e.g., approximative k-nearest neighbor methods). Comparing the test feature vector to the feature vector from enrollment may be suitable for assessing identity of individuals represented by the two vectors, e.g., based on comparing salient features of faces represented by the vectors.

As shown in FIG. 1B, computerized conference assistant 106 includes a voice identification machine 128. The voice identification machine 128 is analogous to the face identification machine 126 because it also attempts to identify an individual. However, unlike the face identification machine 126, which is trained on and operates on video images, the voice identification machine is trained on and operates on audio signals, such as beamformed signal 150 and/or signal(s) 112. The ML and AI techniques described above may be used by voice identification machine 128. The voice identification machine outputs voice IDs 170, optionally with corresponding confidences (e.g., Bob(77%)).

Figure 6:
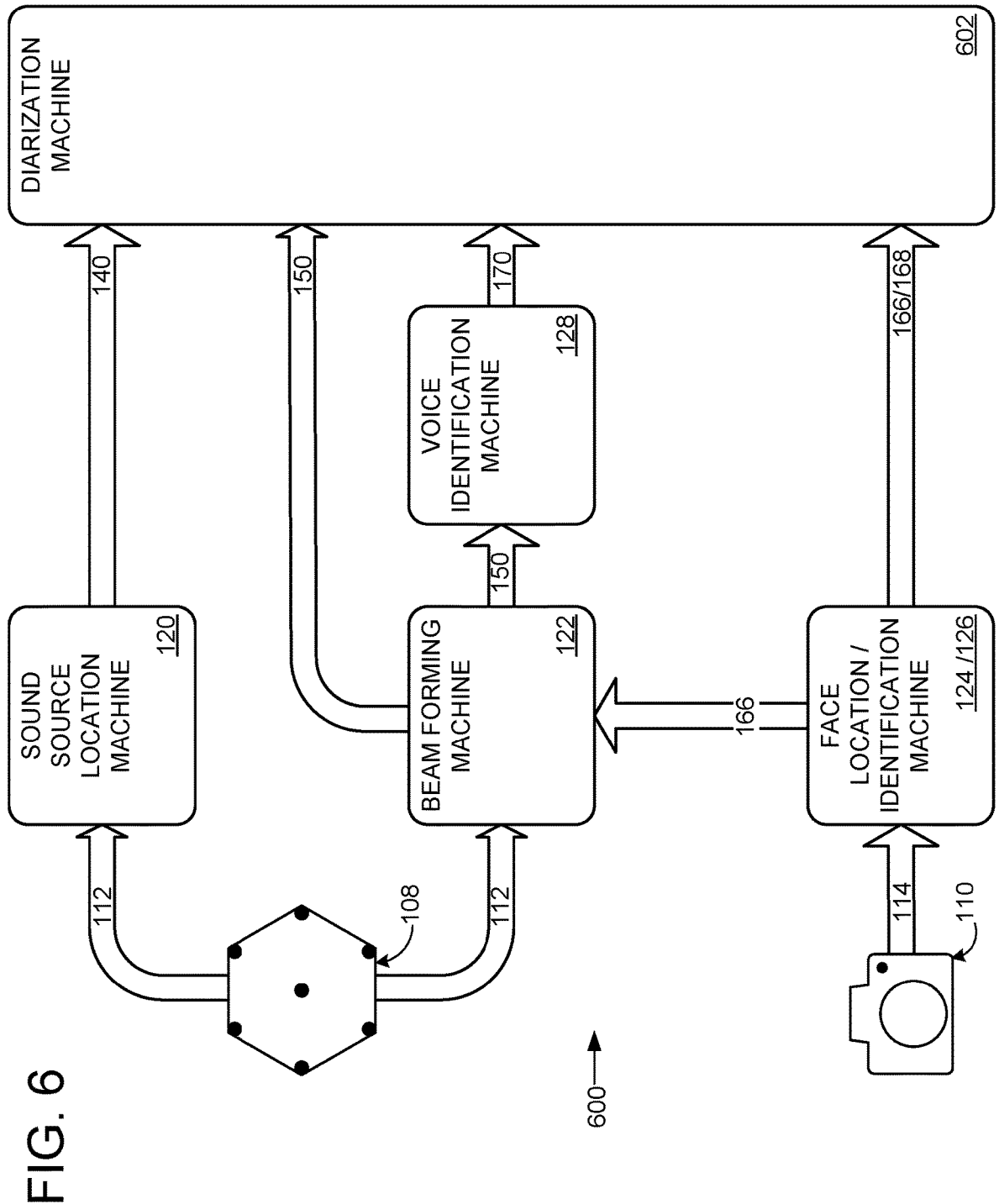
FIG. 6 illustrates an example diarization framework for diarizing utterances made by the human speakers of FIG. 1A.

FIG. 6 schematically shows an example diarization framework 600 for the above-discussed components of computerized conference assistant 106. While diarization framework 600 is described below with reference to computerized conference assistant 106, the diarization framework may be implemented using different hardware, firmware, and/or software components (e.g., different microphone and/or camera placements and/or configurations). Furthermore, SSL machine 120, beamforming machine 122, face location machine 124, and/or face identification machine 128 may be used in different sensor fusion frameworks designed to associate speech utterances with the correct speaker.

In the illustrated implementation, microphones 108 provide signals 112 to SSL machine 120 and beamforming machine 122, and the SLL machine outputs origination 140 to diarization machine 602. Camera 110 provides 360° digital videos 114 to face location machine 124 and face identification machine 126. The face location machine passes the locations of candidate faces 166 (e.g., 23°) to the beamforming machine 122, which the beamforming machine may utilize to select a desired zone where a speaker has been identified. The beamforming machine 122 passes beamformed signal 150 to diarization machine 602 and to voice identification machine 128, which passes voice ID 170 to the diarization machine 602. Face identification machine 128 outputs identities 168 (e.g., "Bob") with corresponding locations of candidate faces (e.g., 23°) to the diarization machine. While not shown, the diarization machine may receive other information and use such information to attribute speech utterances with the correct speaker.

Diarization machine 602 is a sensor fusion machine configured to use the various received signals to associate recorded speech with the appropriate speaker. In some scenarios, diarization machine 602 may diarize an audio sample representing utterances made by two or more human speakers to associate each respective utterance with the corresponding human speaker. In one nonlimiting example, the following algorithm may be employed:

Video input (e.g., 360° digital video 114) from start to time t is denoted as $V_{1:t}$ Audio input from N microphones (e.g., signals 112) is denoted as $A_{1:t}^{[1:N]}$ Diarization machine 602 solves WHO is speaking, at WHERE and WHEN, by maximizing the following:

$$\max_{who, angle} P(who, angle \mid A_{1:t}^{[1:N]}, V_{1:t})$$

Where $P(who, angle \mid A_{1:t}^{[1:N]}, V_{1:t})$ is computed by $P$ $$(who \mid A_{1:t}^{[1:N]}, angle) \times P(angle \mid A_{1:t}^{[1:N]}) \times P(who, angle \mid V_{1:t})$$

Where $P(who \mid A_{1:t}^{[1:N]}, angle)$ is the Voice ID 170, which takes N channel inputs and selects one beamformed signal 150 according to the angle of candidate face 166;

$P(angle \mid A_{1:t}^{[1:N]})$ is the origination 140, which takes N channel inputs and predicts which angle most likely has sound;

$P(who, angle \mid V_{1:t})$ is the identity 168, which takes the video 114 as input and predicts the probability of each face showing up at each angle.

The above framework may be adapted to use any suitable processing strategies, including but not limited to the ML/AI techniques discussed above. Using the above framework, the probability of one face at the found angle is usually dominative, e.g., probability of Bob's face at 23° is 99%, and the probabilities of his face at all the other angles is almost 0%.

Figure 7:
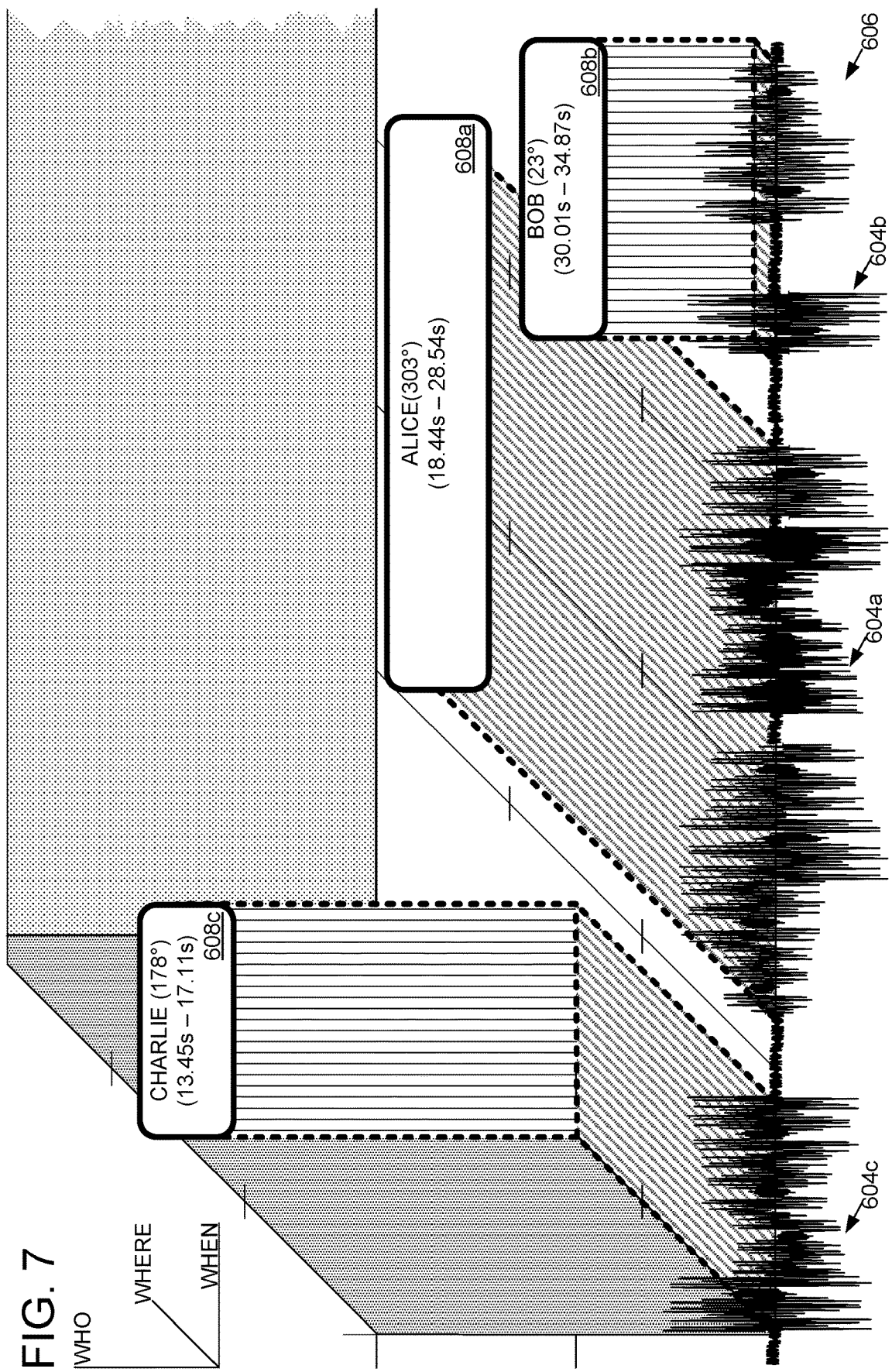
FIG. 7 illustrates an example output of a diarization machine of the computerized conference assistant of FIG. 1A.

FIG. 7 is a visual representation of an example output of diarization machine 602. In FIG. 6, a vertical axis is used to denote WHO (e.g., Bob) is speaking; the horizontal axis denotes WHEN (e.g., 30.01 s-34.87 s) that speaker is speaking; and the depth axis denotes from WHERE (e.g., 23°) that speaker is speaking. Diarization machine 602 may use this WHO/WHEN/WHERE information to label corresponding segments 604 of the audio signal(s) 606 under analysis with labels 608. The segments 604 and/or corresponding labels may be output from the diarization machine 602 in any suitable format. The output effectively associates speech with a particular speaker during a conversation among N speakers, and allows the audio signal corresponding to each speech utterance (with WHO/WHEN/WHERE labeling/metadata) to be used for myriad downstream operations. One nonlimiting downstream operation is conversation transcription, as discussed in more detail below. As another example, accurately attributing speech utterances with the correct speaker can be used by an AI assistant to identify who is talking, thus decreasing a necessity for speakers to address an AI assistant with a keyword (e.g., "Cortana").

Returning briefly to FIG. 1B, computerized conference assistant 106 may include a speech recognition machine 130. As shown in FIG. 8, the speech recognition machine 130 may be configured to translate an audio signal of recorded speech (e.g., signals 112, beamformed signal 150, signal 606, and/or segments 604) into text 800. In the scenario illustrated in FIG. 8, speech recognition machine 130 translates signal 802 into the text: "Would you like to play a game?"

Speech recognition machine 130 may employ any suitable combination of state-of-the-art and/or future natural language processing (NLP), AI, and/or ML techniques. Non-limiting examples of techniques that may be incorporated in an implementation of speech recognition machine 130 include support vector machines, multi-layer neural networks, convolutional neural networks (e.g., including temporal convolutional neural networks for processing natural language sentences), word embedding models (e.g., GloVe or Word2Vec), recurrent neural networks, associative memories, unsupervised spatial and/or clustering methods, graphical models, and/or natural language processing techniques (e.g., tokenization, stemming, constituency and/or dependency parsing, and/or intent recognition).

In some examples, speech recognition machine 130 may be implemented using one or more differentiable functions and at least partially determined by a set of trainable parameters. Accordingly, the trainable parameters may be adjusted through any suitable training procedure, in order to continually improve functioning of the speech recognition machine 130.

Non-limiting examples of training procedures for speech recognition machine 130 include supervised training, zero-shot, few-shot, unsupervised learning methods, reinforcement learning and/or generative adversarial neural network training methods. In some examples, a plurality of components of speech recognition machine 130 may be trained simultaneously with regard to an objective function measuring performance of collective functioning of the plurality of components in order to improve such collective functioning. In some examples, one or more components of speech recognition machine 130 may be trained independently of other components. In an example, speech recognition machine 130 may be trained via supervised training on labelled training data comprising speech audio annotated to indicate actual lexical data (e.g., words, phrases, and/or any other language data in textual form) corresponding to the speech audio, with regard to an objective function measuring an accuracy, precision, and/or recall of correctly recognizing lexical data corresponding to speech audio.

In some examples, speech recognition machine 130 may use an AI and/or ML model (e.g., an LSTM and/or a temporal convolutional neural network) to represent speech audio in a computer-readable format. In some examples, speech recognition machine 130 may represent speech audio input as word embedding vectors in a learned representation space shared by a speech audio model and a word embedding model (e.g., a latent representation space for GloVe vectors, and/or a latent representation space for Word2Vec vectors). Accordingly, by representing speech audio inputs and words in the learned representation space, speech recognition machine 130 may compare vectors representing speech audio to vectors representing words, to assess, for a speech audio input, a closest word embedding vector (e.g., based on cosine similarity and/or approximative k-nearest neighbor methods or any other suitable comparison method).

In some examples, speech recognition machine 130 may be configured to segment speech audio into words (e.g., using LSTM trained to recognize word boundaries, and/or separating words based on silences or amplitude differences between adjacent words). In some examples, speech recognition machine 130 may classify individual words to assess lexical data for each individual word (e.g., character sequences, word sequences, n-grams). In some examples, speech recognition machine 130 may employ dependency and/or constituency parsing to derive a parse tree for lexical data. In some examples, speech recognition machine 130 may operate AI and/or ML models (e.g., LSTM) to translate speech audio and/or vectors representing speech audio in the learned representation space, into lexical data, wherein translating a word in the sequence is based on the speech audio at a current time and further based on an internal state of the AI and/or ML models representing previous words from previous times in the sequence. Translating a word from speech audio to lexical data in this fashion may capture relationships between words that are potentially informative for speech recognition, e.g., recognizing a potentially ambiguous word based on a context of previous words, and/or recognizing a mispronounced word based on a context of previous words. Accordingly, speech recognition machine 130 may be able to robustly recognize speech, even when such speech may include ambiguities, mispronunciations, etc.

Speech recognition machine 130 may be trained with regard to an individual, a plurality of individuals, and/or a population. Training speech recognition machine 130 with regard to a population of individuals may cause speech recognition machine 130 to robustly recognize speech by members of the population, taking into account possible distinct characteristics of speech that may occur more frequently within the population (e.g., different languages of speech, speaking accents, vocabulary including colloquialisms and neologisms, and/or any other distinctive characteristics of speech that may vary between members of populations). Training speech recognition machine 130 with regard to an individual and/or with regard to a plurality of individuals may further tune recognition of speech to take into account further differences in speech characteristics of the individual and/or plurality of individuals. In some examples, different speech recognition machines (e.g., a speech recognition machine (A) and a speech recognition (B)) may be trained with regard to different populations of individuals, thereby causing each different speech recognition machine to robustly recognize speech by members of different populations, taking into account speech characteristics that may differ between the different populations.

To properly enable and support voice identification and speech recognition, an enrollment process may be employed in to order to generate a so-called "voice signature" or "voiceprint" for a participant. These signatures are used to distinguish vocalizations of one participant from those another, and to efficiently convert those vocalizations into computer-recognized words, phrases, etc. Effective enrollment requires getting a baseline speech sample from a user. This may be to be performed in a setting where the to-be-enrolled speaker is known and identified. Further, voice enrollment often requires minimal noise or other interference, and that the captured sample be uninterrupted and of significant duration (e.g., two or more minutes).

Satisfying the above enrollment requirements (known speaker, noise-free environment, uninterrupted capture spanning multiple minutes) can be burdensome to the user. Typically, enrollment must be performed as a separate task, independent of any other productive activity, and as mentioned above the user must set aside several minutes to perform the task. This barrier may lead to the user delaying or putting off enrollment, or avoiding it altogether, especially if some/all benefits of voice identification/recognition are not directly apparent to the user. Other factors may complicate enrollment, such as the natural variance and syncopation of human speech, and the participation by multiple human speakers in a conversation, where enrollment of a single human speaker at a given is desired.

Accordingly, the current system in some implementations may enable unobtrusive automatic voice enrollment. As indicated elsewhere, environment 100 may contain multiple participants at any given moment and, still further, any number of people from a given organization could potentially attend a meeting in environment 100. Accordingly, to perform voice enrollment, a threshold step is to identify the participant for which enrollment data is to be sought. Audio (e.g., from microphones 108) and/or video (e.g., from camera 110) may be used to identify a to-be-enrolled participant. This information may be supplemented by other data, for example facial recognition confidence levels may be adjusted by reviewing calendar information to see who has accepted invitations to a meeting.

As a specific example, audio information into the microphone array (i.e., microphones 108A-108G) may be assessed to identify the angular location of an active speaker 102, e.g., using SSL machine 120. Then, camera information may be assessed to identify the speaker. In many cases, the information and processing resources needed to make a visual identification of a user are more readily available than those needed to perform voice identification/recognition. For example, video content and still images are easily obtainable for identified individuals (e.g., employees) and, to a large extent, can be captured without concerns or issues associated with interference/noise (in contrast to audio capture). Thus, visual/face "enrollment" typically is completed before audio enrollment, and thus can be leveraged to perform the threshold identification needed for voice enrollment.

Other information may be used to identify an active speaker. For example, if it were known that a particular user's stylus was being used at a wall-mounted display device at the front of a conference room, and cameras indicated a single individual in the location of the wall-mounted device, then the identity of the speaker could be confidently inferred. In another example, relative register/pitch could be used to estimate an observed speaker's gender, and thereby increase/decrease confidence levels based on known meeting attendees. Also, it will be appreciated that identifications may be made in an after-the-fact post processing operation, such that a voiceprint for a given user is available for future use, if not in the current meeting/conference.

In any case, the system at some point may make a determination as to when to conduct sampling and/or, for a given amount of sampled audio, what portions of such audio are to be designated as samples to be used for generating the voice print. Examples of such determination include (1) sampling and/or processing audio beginning at a point when the speakers lips are moving; (2) sampling and/or processing audio when other participants are not speaking; (3) sampling and/or processing audio when noise or other sound sources are minimal; etc.

Still, further, the system may proactively attempt to improve the quality of enrollment audio, by controlling the processing of audio. For example, in an array of multiple microphones, as in FIG. 1A, processing may be differentially controlled. For example, based on a determination that the speaker's audio is most advantageously captured at a particular microphone, signal captured at the other microphones may be attenuated or given lesser weight. In addition to or instead of this, active noise cancelling may be employed at the selected microphone, based on signal captured at the other microphones. Any number of appropriate processing and noise cancellation strategies may be employed.

Method 900 of FIG. 9 depicts an example of conducting voice enrollment in accordance with the above description. As indicated, such a method may include identifying an active speaker (902) and obtaining a sample suitable for establishing the voiceprint (904). Step 904 may include initiating capture/sample based on a determination that the identified speaker has begun talking, e.g., via using cameras to see lip movement or microphones to detect commencement of speaking. This may also be predicated on the speaker talking at sufficient volume and/or that noise, speech from other participants, or other interference is below a threshold level. Step 904 may also be performed in connection with previously-captured audio, for purposes of designating audio segments as being usable for calculating the voiceprint. At 906, capture and/or processing is performed using mitigation techniques to improve the quality of the sample, which may be thought of as improving the signal-to-noise (SNR) ratio of audio capture for the targeted speaker. For example, if volume for the targeted speaker is strongest at one or two of microphones 108 (FIG. 1A), then capture/processing may de-emphasize the other microphones. Additionally, a signal at the non-dominant microphones may be used to generate a cancellation signal applied to capture in the dominant microphone(s). Any number of techniques may be used to improve the quality/fidelity/volume of audio for the targeted speaker, while minimizing non-signal contributions from other sources. At 908, the sampled audio is used to build the voice signature, for subsequent use in authentication/identification, voice commands, speech-to-text conversion, etc. (step 910).

Labeled and/or partially labelled audio segments may be used to not only determine which of a plurality of N speakers is responsible for an utterance, but also translate the utterance into a textural representation for downstream operations, such as transcription. FIG. 10 shows a nonlimiting example in which the computerized conference assistant 106 uses microphones 108 and camera 110 to determine that a particular stream of sounds is a speech utterance from Bob, who is sitting at 23° around the table 104 and saying: "Would you like to play a game?" The identities and positions of Charlie and Alice are also resolved, so that speech utterances from those speakers may be similarly attributed and translated into text.

FIG. 11 shows an example conference transcript 1100, which includes text attributed, in chronological order, to the correct speakers. Transcriptions optionally may include other information, like the times of each speech utterance and/or the position of the speaker of each utterance. In scenarios in which speakers of different languages are participating in a conference, the text may be translated into a different language. For example, each reader of the transcript may be presented a version of the transcript with all text in that reader's preferred language, even if one or more of the speakers originally spoke in different languages. Transcripts generated according to this disclosure may be updated in realtime, such that new text can be added to the transcript with the proper speaker attribution responsive to each new utterance.

FIG. 12 shows a nonlimiting framework 1200 in which speech recognition machines 130a-n are downstream from diarization machine 602. Each speech recognition machine 130 optionally may be tuned for a particular individual speaker (e.g., Bob) or species of speakers (e.g., Chinese language speaker, or English speaker with Chinese accent). In some embodiments, a user profile may specify a speech recognition machine (or parameters thereof) suited for the particular user, and that speech recognition machine (or parameters) may be used when the user is identified (e.g., via face recognition). In this way, a speech recognition machine tuned with a specific grammar and/or acoustic model may be selected for a particular speaker. Furthermore, because the speech from each different speaker may be processed independent of the speech of all other speakers, the grammar and/or acoustic model of all speakers may be dynamically updated in parallel on the fly. In the embodiment illustrated in FIG. 12, each speech recognition machine may receive segments 604 and labels 608 for a corresponding speaker, and each speech recognition machine may be configured to output text 800 with labels 608 for downstream operations, such as transcription.

FIG. 13 shows a nonlimiting framework 1300 in which speech recognition machines 130a-n are upstream from diarization machine 602. In such a framework, diarization machine 602 may initially apply labels 608 to text 800 in addition to or instead of segments 604. Furthermore, the diarization machine may consider natural language attributes of text 800 as additional input signals when resolving which speaker is responsible for each utterance.

FIG. 14 shows a flowchart illustrating a method 1400 of voice identification enrollment. Method 1400 may be at least partially implemented on computerized conference assistant 106, for example. As such, references to assistant 106 are made throughout the description of method 1400. Method 1400 may be implemented on any suitable device(s), however. Generally, method 1400 may facilitate a variety of functions in a setting where human speech is spoken: the identification of a human speaker, the recognition of speech components uttered by human speaker, the transcription of speech, and the attribution or diarization of speech from one or more human speakers, among other potential functions.

At 1402, method 1400 includes, during a meeting in which two or more human speakers speak at different times, determining whether one or more conditions of a protocol for sampling meeting audio used to establish human speaker voiceprints are satisfied. As indicated at 1404, the condition(s) may include detecting that the human speaker is speaking. Detecting that the human speaker may include analyzing output from microphone(s) 108 (e.g., detecting output above a threshold magnitude), performing speech recognition via speech recognition machine(s) 130, and/or any other suitable process(es). As indicated at 1406, the condition(s) may include the SNR of meeting audio being greater than a threshold. The threshold may have any suitable value, and may be predetermined in such a manner that meeting audio above the threshold is likely to produce samples of sufficient integrity to establish human speaker voiceprints. As indicated at 1408, the condition(s) may include detecting lip/mouth movement of the human speaker. Any suitable method of detecting lip movement may be used, such as by optically detecting lip movement via camera(s) 110, face location machine 124, and/or face identification machine(s) 126. As indicated at 1410, the condition(s) may include respective contributions to the meeting audio corresponding to utterances from one or more other human speaker(s) being less than a threshold. The threshold may assume any suitable value (e.g., a magnitude of audio), and be predetermined in such a manner that the respective contributions below the threshold are likely not to render samples of meeting audio insufficient for establishing a voiceprint of the instant human speaker—e.g., the given human speaker for which method 1400 is performed. Assessing the contributions of different human speakers to meeting audio may utilize one or more of microphone(s) 108, machine 120, machine 122, machine 124, machine(s) 126, machine(s) 128, and machine(s) 130.

At 1412, method 1400 includes, in response to determining that the one or more conditions are satisfied, selecting a sample of meeting audio according to the protocol, the sample representing an utterance made by one of the human speakers. As indicated at 1414, the protocol may include selecting the sample using, in a multi-microphone setting, a microphone that is closest to the target speaker. For example, output from two or more of microphone(s) 108 may be analyzed to determine—e.g., based on amplitude and/or phase difference—which microphone outputs the highest signal (e.g., in terms of amplitude and/or SNR) and therefore is closest to the human speaker. As additional examples, the protocol may include using particular sets of microphones at specific times, using one or more of machines 120, 122, 124, 126, 128, and 130 in connection with selecting the sample, selecting the sample when the human speaker and not other speakers are speaking, selecting the sample in response to an explicit command from a human speaker to collect the sample, selecting the sample from audio collected in one or more selected beamformed zone(s), and/or selecting the sample at predetermined time(s). In some examples, selection of the sample may occur substantially in real-time relative to the utterances captured in the sample—for example, the sample may be selected temporally proximate to or immediately after such utterances. In such examples, the sample of the meeting audio temporally corresponds to a time at which the one or more conditions become satisfied. In other examples, sample selection may be implemented in a post-process manner in which a recording of meeting audio is analyzed some time after the recording (e.g., after the conclusion of the meeting) to select the sample using one or more of the factors described herein that drive sample selection. Generally, sample selection may occur at any suitable time relative to a meeting. Similarly, recording of meeting audio may occur at any suitable time relative to a meeting; in some examples, satisfaction of the condition(s) may prompt recording of meeting audio, while in other examples satisfaction of the condition(s) may be determined based on previously-recorded meeting audio. At 1416, method 1400 includes establishing, based at least on the sample, a voiceprint of the human speaker. As indicated at 1418, the voiceprint may be established based further on facial data of the human speaker. For example, the voiceprint may be established based on data used by or output from face location machine 124, such as a location output from the machine of the human speaker's face that helps spatially associate utterances made by the human speaker with his or her location; and/or data used by or output from face identification machine(s) 126, such as an identity that can be associated with the voiceprint and audio samples representing utterances from the human speaker. As indicated at 1420, the voiceprint may be established based on determining location information regarding the location where the utterance was made by the human speaker. This may include using data used by or output from microphone(s) 108 (e.g., a location where the direction of the utterance is strongest), camera(s) 110 (a location where lip movement is detected), SSL machine 120 (e.g., a localized sound source location), beamforming machine 122 (e.g., one or more zones where sound is strongest), and/or face location machine 124 (e.g., a location of a detected face). The voiceprint may be used for any suitable purpose—human speaker identification, speech component recognition, transcription, diarization, etc.

At 1422, method 1400 includes determining an identity of the human speaker. The identity may be determined based on the voiceprint (e.g., if the identity has already been associated with the voiceprint), using the voice identification machine(s) 128 (e.g., which use the voiceprint to determine the identity), and/or via one or more of machines 120, 122, 124, 126, 128, and 130. As indicated at 1424, the identity may be determined before establishing the voiceprint—e.g., in the manners described above, or in other examples the identity may be pre-determined such as in a prior computing device session, or explicitly supplied by the human speaker. As indicated at 1426, the identity may be determined after establishing the voiceprint (e.g., based on the voiceprint). Accordingly, the identity may be associated with the voiceprint based on one or more of the data sets used to determine the identity: audio data of the human speaker, facial data (e.g., a face location, a recognized or identified face, a face image) of the human speaker, and/or recognized speech, as examples.

At 1428, method 1400 includes selecting another sample of meeting audio according to the protocol, the sample representing respective utterances made by two or more human speakers. At 1430, method 1400 includes diarizing (e.g., via diarization machine 602 of FIG. 6) the other sample to associate each respective utterance with a corresponding human speaker.

At 1432, method 1400 includes executing a computing device command based on the voiceprint established at 1416. Executing the computing device command may include performing a computing device action on behalf of the human speaker for which the voiceprint is established based on user input, utilizing credentials of the human speaker, attributing a command to the human speaker based on user input, etc. Any suitable computing device command may be executed, including but not limited to executing an application and providing input. In some examples, execution of the computing device command may occur substantially in real-time relative to a user input requesting the command, while in other examples the computing device command may be executed substantially after receiving a user input requesting the command (e.g., following the conclusion of the meeting).

Method 1400 may include alternative or additional steps. As an example, method 1400 may include adjusting an operating parameter of a recording system (e.g., a plurality of microphones such as microphone(s) 108) used to sample meeting audio. In some examples, the operating parameter may be adjusted to increase the SNR of current or subsequent samples of meeting audio. Adjusting the operating parameter may include selecting which microphone(s) are used to sample audio, employing noise/signal cancellation with signal(s) from one or more microphones, adjusting the operation of beamforming machine 122, adjusting the operation of SSL machine 120, and/or any other suitable type of adjustment.

Speech diarization, recognition, and transcription as described herein may be tied to a computing system of one or more computing devices. In particular, such methods and processes may be implemented as a computer-application program or service, an application-programming interface (API), a library, and/or other computer-program product.

FIG. 1B schematically shows a non-limiting embodiment of a computerized conference assistant 106 that can enact one or more of the methods, processes, and/or processing strategies described above. Computerized conference assistant 106 is shown in simplified form in FIG. 1B. Computerized conference assistant 106 may take the form of one or more stand-alone microphone/camera computers, Internet of Things (IoT) appliances, personal computers, tablet computers, home-entertainment computers, network computing devices, gaming devices, mobile computing devices, mobile communication devices (e.g., smart phone), and/or other computing devices in other implementations. In general, the methods and processes described herein may be adapted to a variety of different computing systems having a variety of different microphone and/or camera configurations.

Computerized conference assistant 106 includes a logic system 180 and a storage system 182. Computerized conference assistant 106 may optionally include display(s) 184, input/output (I/O) 186, and/or other components not shown in FIG. 1B.

Logic system 180 includes one or more physical devices configured to execute instructions. For example, the logic system may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic system may include one or more processors configured to execute software instructions. Additionally or alternatively, the logic system may include one or more hardware or firmware logic circuits configured to execute hardware or firmware instructions. Processors of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely accessible, networked computing devices configured in a cloud-computing configuration.

Storage system 182 includes one or more physical devices configured to hold instructions executable by the logic system to implement the methods and processes described herein. When such methods and processes are implemented, the state of storage system 182 may be transformed—e.g., to hold different data.

Storage system 182 may include removable and/or built-in devices. Storage system 182 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage system 182 may include volatile, nonvolatile, dynamic, static, read/write, read-only, random-access, sequential-access, location-addressable, file-addressable, and/or content-addressable devices.

It will be appreciated that storage system 182 includes one or more physical devices and is not merely an electromagnetic signal, an optical signal, etc. that is not held by a physical device for a finite duration.

Aspects of logic system 180 and storage system 182 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

As shown in FIG. 1B, logic system 180 and storage system 182 may cooperate to instantiate SSL machine 120, beamforming machine 122, face location machine 124, face identification machine 126, voice identification machine 128, speech recognition machine 130, and experience machines 132. As used herein, the term "machine" is used to collectively refer to the combination of hardware, firmware, software, and/or any other components that are cooperating to provide the described functionality. In other words, "machines" are never abstract ideas and always have a tangible form. The software and/or other instructions that give a particular machine its functionality may optionally be saved as an unexecuted module on a suitable storage device, and such a module may be transmitted via network communication and/or transfer of the physical storage device on which the module is saved.

When included, display(s) 184 may be used to present a visual representation of data held by storage system 182. This visual representation may take the form of a graphical user interface (GUI). As one example, transcript 1000 may be visually presented on a display 184. As the herein described methods and processes change the data held by the storage machine, and thus transform the state of the storage machine, the state of display(s) 184 may likewise be transformed to visually represent changes in the underlying data. For example, new user utterances may be added to transcript 1000. Display(s) 184 may include one or more display devices utilizing virtually any type of technology. Such display devices may be combined with logic system 180 and/or storage system 182 in a shared enclosure, or such display devices may be peripheral display devices.

When included, input/output (I/O) 186 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Furthermore, I/O 186 optionally may include a communication subsystem configured to communicatively couple computerized conference assistant 106 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computerized conference assistant 106 to send and/or receive messages to and/or from other devices via a network such as the Internet.

Another example provides a method of voice identification enrollment comprising during a meeting in which two or more human speakers speak at different times, determining whether one or more conditions of a protocol for sampling meeting audio used to establish human speaker voiceprints are satisfied, in response to determining that the one or more conditions are satisfied, selecting a sample of meeting audio according to the protocol, the sample representing an utterance made by one of the human speakers, and establishing, based at least on the sample, a voiceprint of the human speaker. In such an example, the one or more conditions may include detecting that the human speaker has begun speaking. In such an example, the one or more conditions alternatively or additionally may include a signal-to-noise ratio of the meeting audio being greater than a threshold. In such an example, the protocol may include selecting the sample using a microphone of a plurality of microphones closest to the human speaker. In such an example, the method alternatively or additionally may include determining an identity of the human speaker after establishing the voiceprint of the human speaker. In such an example, the method alternatively or additionally may include determining an identity of the human speaker before establishing the voiceprint of the human speaker. In such an example, the sample of the meeting audio alternatively or additionally may temporally correspond to a time at which the one or more conditions become satisfied. In such an example, the one or more conditions alternatively or additionally may include detecting lip movement of the human speaker. In such an example, the one or more conditions alternatively or additionally may include respective contributions to the meeting audio corresponding to utterances from one or more other human speakers being less than a threshold. In such an example, the method alternatively or additionally may include selecting another sample of meeting audio according to the protocol, the other sample representing respective utterances made by two or more of the human speakers, and diarizing the other sample to associate each respective utterance with a corresponding human speaker. In such an example, the voiceprint alternatively or additionally may be established based on facial data of the human speaker. In such an example, the method alternatively or additionally may include determining an identity of the human speaker, and associating the identity with the voiceprint based on the facial data. In such an example, the voiceprint alternatively or additionally may be established based on determining location information regarding a location where the utterance was made.

Another example provides a computing device comprising a logic machine, and a storage machine holding instructions executable by the logic machine to, during a meeting in which two or more human speakers speak at different times, determine whether one or more conditions of a protocol for sampling meeting audio used to establish human speaker voiceprints are satisfied, in response to determining that the one or more conditions are satisfied, select a sample of meeting audio according to the protocol, the sample representing an utterance made by one of the human speakers, and establish, based at least on the sample, a voiceprint of the human speaker. In such an example, the one or more conditions may include detecting that the human speaker has begun speaking. In such an example, the one or more conditions alternatively or additionally may include a signal-to-noise ratio of the meeting audio being greater than a threshold. In such an example, the one or more conditions alternatively or additionally may include detecting lip movement of the human speaker. In such an example, the one or more conditions alternatively or additionally may include respective contributions to the meeting audio corresponding to utterances from one or more other human speakers being less than a threshold.

Another example provides a voice identification enrollment system comprising a plurality of microphones, a logic machine, and a storage machine holding instructions executable by the logic machine to during a meeting in which two or more human speakers speak at different times, determine whether one or more conditions of a protocol for sampling meeting audio via the plurality of microphones used to establish human speaker voiceprints are satisfied, in response to determining that the one or more conditions are satisfied, select a sample of meeting audio according to the protocol, the sample representing an utterance made by one of the human speakers, and establish, based at least on the sample, a voiceprint of the human speaker. In such an example, the instructions alternatively or additionally may be executable to adjust an operating parameter of the plurality of microphones to increase a signal-to-noise ratio of a subsequent sample of the meeting audio.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of voice identification enrollment, comprising:
   recording meeting, audio of a meeting in which two or more human speakers speak at different times;
   during the meeting, determining whether one or more conditions of a protocol for sampling meeting audio used to establish a voiceprint for a selected human speaker are satisfied, the one or more conditions including respective contributions to the meeting audio from one or more human speakers other than the selected human speaker being less than an audio magnitude threshold, wherein the selected human speaker is one of the two or more speakers who speak at different times;
   in response to determining that the respective contributions to the meeting audio from the one or more human speakers other than the selected human speaker are greater than or equal to the audio magnitude threshold, not selecting any sample of the meeting audio for establishing the voiceprint;
   in response to determining that the one or more conditions are satisfied, selecting a sample of the meeting audio according to the protocol, the sample representing an utterance made by the selected human speaker and temporally corresponding to a time at which the respective contributions to the meeting audio from the one or more human speakers are less than the audio magnitude threshold; and
   establishing, based at least on the sample, the voiceprint of the selected human speaker.

2. The method of claim 1, where the one or more conditions further include detecting that the selected human speaker has begun speaking.

3. The method of claim 1, where the one or more conditions further include a signal-to-noise ratio of the meeting audio being greater than a threshold.

4. The method of claim 1, where the protocol includes selecting the sample using a microphone of a plurality of microphones closest to the selected human speaker.

5. The method of claim 1, further comprising determining an identity of the selected human speaker after establishing the voiceprint of the selected human speaker.

6. The method of claim 1, further comprising determining an identity of the selected human speaker before establishing the voiceprint of the selected human speaker.

7. The method of claim 1, where the sample of the meeting audio temporally corresponds to the time at which the one or more conditions become satisfied.

8. The method of claim 1, where the one or more conditions further include detecting lip movement of the selected human speaker.

9. The method of claim 1, further comprising:
   selecting another sample of meeting audio according to the protocol, the other sample representing respective utterances made by two or more of the human speakers; and
   diarizing the other sample to associate each respective utterance with a corresponding human speaker.

10. The method of claim 1, where the voiceprint is established based further on facial data of the selected human speaker.

11. The method of claim 10, further comprising determining an identity of the selected human speaker, and associating the identity with the voiceprint based on the facial data.

12. The method of claim 1, where the voiceprint is established based further on determining location information regarding a location where the utterance was made.

13. A computing device, comprising:
   a logic machine; and
   a storage machine holding instructions executable by the logic machine to:
   record meeting audio of a meeting in which two or more human speakers speak at different times;
   during the meeting, determine whether one or more conditions of a protocol for sampling meeting audio used to establish a voiceprint for a selected human speaker are satisfied, the one or more conditions including respective contributions to the meeting audio from one or more human speakers other than the selected human speaker being less than an audio magnitude threshold, wherein the selected human speakers is one of the two or mores speakers who speak at different times;

in response to determining that the respective contributions to the meeting audio from the one or more human speakers other than the selected human speak are greater than or equal to the audio magnitude threshold, not select any sample of the meeting audio for establishing the voiceprint;

in response to determining that the one or more conditions are satisfied, select a sample of the meeting audio according to the protocol, the sample representing an utterance made by the selected human speaker and temporally corresponding to a time at which the respective contributions to the meeting audio from the one or more human speakers are less than the audio magnitude threshold; and establish, based at least on the sample, the voiceprint of the selected human speaker.

14. The computing device of claim 13, where the one or more conditions include detecting that the selected human speaker has begun speaking.

15. The computing device of claim 13, where the one or more conditions include a signal-to-noise ratio of the meeting audio being greater than a threshold.

16. The computing device of claim 13, where the one or more conditions include detecting lip movement of the selected human speaker.

17. A voice identification enrollment system, comprising:
a plurality of microphones;
a logic machine; and
a storage machine holding instructions executable by the logic machine to:

record meeting audio of a meeting in which two or more human speakers speak at different times;

during the meeting, determine whether one or more conditions of a protocol for sampling meeting audio via the plurality of microphones used to establish a voiceprint for a selected human speaker are satisfied, the one or more conditions including respective contributions to the meeting audio from one or more human speakers other than the selected human speaker being less than an audio magnitude threshold, wherein the selected human speakers is one of the two or more speakers who speak at different times;

in response to determining that the respective contributions to the meeting audio from the one or more human speakers other than the selected human speaker are greater than or equal to the audio magnitude threshold, not select any sample of the meeting audio for establishing the voiceprint;

in response to determining that the one or more conditions are satisfied, select a sample of the meeting audio according to the protocol, the sample representing an utterance made by the selected human speaker and temporally corresponding to a time at which the respective contributions to the meeting audio from the one or more human speakers are less than the audio magnitude threshold; and establish, based at least on the sample, the voiceprint of the selected human speaker.

18. The voice identification enrollment system of claim 17, where the instructions are further executable to adjust an operating parameter of the plurality of microphones to increase a signal-to-noise ratio of a subsequent sample of the meeting audio.

* * * * *